United States Patent [19]

Kim

[11] Patent Number: 5,519,689
[45] Date of Patent: May 21, 1996

[54] TRAFFIC CONTROL APPARATUS AND METHOD OF USER-NETWORK INTERFACE OF ASYNCHRONOUS TRANSFER MODE

[75] Inventor: Young-II Kim, Seoul, Rep. of Korea

[73] Assignee: SamSung Electronics Co., Ltd., Suwon, Rep. of Korea

[21] Appl. No.: 261,058

[22] Filed: Jun. 13, 1994

[30] Foreign Application Priority Data

Jun. 12, 1993 [KR] Rep. of Korea ............... 10779/1993

[51] Int. Cl.⁶ ..................... H04L 12/26; H04L 12/56
[52] U.S. Cl. ................. 370/17; 370/60.1; 370/68.1; 370/94.2
[58] Field of Search ....................... 370/13, 14, 17, 370/60, 60.1, 85.6, 68.1, 110.1, 94.1, 94.2, 85.7, 95.1; 371/20.1

[56] References Cited

U.S. PATENT DOCUMENTS

| | | | |
|---|---|---|---|
| 4,984,264 | 1/1991 | Katsube | 370/17 |
| 5,084,867 | 1/1992 | Tachibana et al. | 370/60 |
| 5,119,364 | 6/1992 | Thiebaut et al. | 370/13 |
| 5,119,367 | 6/1992 | Kawakatsu et al. | 370/60 |
| 5,119,369 | 6/1992 | Tanabe et al. | 370/60 |
| 5,136,584 | 8/1992 | Hedlund | 370/60 |
| 5,153,877 | 10/1992 | Esaki et al. | 370/85.6 |
| 5,166,926 | 11/1992 | Cisneros et al. | 370/60 |
| 5,173,897 | 12/1992 | Schrodi et al. | 370/60 |
| 5,214,642 | 5/1993 | Kunimoto et al. | 370/60 |
| 5,249,178 | 9/1993 | Kurano et al. | 370/60 |
| 5,253,247 | 10/1993 | Hirose et al. | 370/54 |
| 5,258,977 | 11/1993 | Wolker et al. | 370/58.1 |
| 5,268,896 | 12/1993 | Pauwels | 370/60 |
| 5,276,676 | 1/1994 | Horn et al. | 370/17 |
| 5,280,483 | 1/1994 | Kamoi et al. | 370/60 |
| 5,287,347 | 2/1994 | Spanke | 370/60 |
| 5,317,563 | 5/1994 | Oouchi et al. | 370/60 |
| 5,321,692 | 6/1994 | Wallmeier | 370/60 |
| 5,339,310 | 8/1994 | Taniguchi | 370/60 |
| 5,402,426 | 3/1995 | Foglar et al. | 370/60 |

*Primary Examiner*—Wellington Chin
*Assistant Examiner*—Chau T. Nguyen
*Attorney, Agent, or Firm*—Robert E. Bushnell

[57] ABSTRACT

A traffic control method and system for a broadband user-network interface which connects subscriber terminals to a public network in an ATM exchange including a broadband-terminal equipment, a local exchange which fixedly assigns virtual path identifiers in accordance with traffic characteristics and processes the traffic received through the assigned virtual path identifiers and a virtual channel identifier, and a broadband-network termination disposed between the broadband-terminal equipment and the local exchange for modulating and demodulating a signal transmitted/received and outputs a modulated/demodulated signal. The broadband-network termination includes a connection control unit for analyzing call establishment request information from one of a plurality of subscriber terminals to thereby detect a corresponding traffic class, quality of service and address of destination, and controlling connection admission based upon detected information and simultaneously outputting transmission bandwidth information to thereby assign a virtual channel identifier; a generic flow control unit for analyzing a generic function control field in a cell header of a received cell generated from a call connected through the connection admission control unit to fairly use public media used by the plurality of subscriber terminals for minimizing cell transmission delay; a traffic control unit for monitoring whether the received cell indicative of the call violates traffic parameters described by the calling subscriber terminal and controlling a cell loss priority bit in a corresponding cell header to thereby execute cell transmission, cell shaping, and cell discarding.

26 Claims, 11 Drawing Sheets

TRAFFIC CONTROL APPARATUS AND METHOD OF USER-NETWORK INTERFACE OF ASYNCHRONOUS TRANSFER MODE

CROSS-REFERENCE TO RELATED APPLICATIONS

This application makes reference to, incorporates the same herein, and claims all benefits incurring under 35 U.S.C. §119 from an application for *Traffic Control Apparatus And Method Of User Network Interface Of Asynchronous Transfer Mode* filed in the Korean Industrial Property Office on 12 Jun. 1993 and assigned Ser. No. 1993/10779.

BACKGROUND OF THE INVENTION

1. Technical Field

The present invention relates to a communication network using an asynchronous transfer mode ATM and particularly to a traffic control method and system for controlling traffic flow of a stream of cells in a broadband user-network interface in an ATM communication network.

2. Background Art

Generally, reference configuration of a user-network interface of a broadband-integrated service digital network B-ISDN is prescribed by CCITT Recommendation I.413, an international standard used to describe physical layer information flows according to the broadband-integrated service digital network B-ISDN protocol and identifies interface functions. CCITT Recommendation I.4:13 also sets standards for respective functional groups and reference points to be adapted for the characteristics of the B-ISDN on the basis of a reference model of an existent narrow band-integrated service digital network N-ISDN.

FIG. 1 illustrates a typical physical configuration of a user-network interface of the broadband-integrated service digital network B-ISDN as recommended by the CCITT based on the reference model of an N-ISDN. In this configuration, the user-network inface includes essential functional groups such as a broadband-terminal equipment B-TE 10, a broadband-network termination B-NT2 12, a broadband-network termination B-NT1 14 and a local exchange LEX 16. Additional terminal equipment TE (not shown)and broadband-terminal adaptor B-TA may be connected to the B-NT2 12 for providing a matching or adaptation function. Reference points $S_B$ and $T_B$ for channel interface structure and distinguishing the respective functional groups are also established.

Referring to FIG. 1, the B-TE 10 is referred to as all purpose communication equipments with broadband communication functions such as telephones, facsimile machines, televisions, computers, etc., and is also referred to as a multimedia terminal with more advanced functions. Typical functions of the B-TE 10 are upper level protocal handling, maintenance, interface functions and connection services. The B-NT1 14, on the other hand, supplies functions that are broadly equivalent to those of a physical layer of an open system interconnection OSI model. Examples of B-NT1 14 functions are transmission interface handling, maintenance, and modulating/demodulating for physical transmission and reception of data via the physical layer.

Similarly, the B-NT2 12 contains functions found in the physical layer with additional functions found in upper layers of the OSI model. The main functions of the B-NT2 12 are however, a connection admission control CAC, generic flow control GFC, multiplexing and demultiplexing, resource management, signaling, usage parameter control UPC, and switching function among internal terminals. These are most essential functions in the user-network interface (hereinafter referred to as 'UNI').

The B-TA connected between the TE and B-NT2 12 (not shown) is a protocal convertor that serves as an intermediation for matching existent simple, slow, and low functional terminals having no broadband function with high function terminals having broadband functions, for converting signals of different protocol with one another.

The LEX 16 performs a switching function through the B-ISDN to a destination node. Although the LEX 16 is not a component of the UNI, it controls usage parameters of the traffic of an incoming stream of cells into a network from the interface, and notifies possible congestions occurring in the network for performing necessary operation and maintenance OAM function of the UNI. As shown in FIG. 1, a construction L by layers of the functional groups exists in the UNI(H). A physical layer PHY serves to receive or transmit direct electrical signals in media using broadband communication; and an synchronous transfer mode ATM layer executes all traffic control functions for controlling a cell as an information transmission unit input through the physical layer PHY. An ATM adaptation layer AAL supports higher-layer functions of the subscriber and control planes and supports connections between ATM and non-ATM interfaces. Information is mapped by the adaptation layer into cells. At the transmitting end, information units are segmented or are collected to be inserted into ATM cells. At the receiving end, the information units are reassembled or read-out from ATM cells. A stream of ATM cells by layers is shown in FIG. 1 by an arrow having an up stream direction toward a network.

Typically, in the construction of FIG. 1, the connection admission control CAC of the B-NT2 12 determines all controls which are performed by the network during a call establishment. For instance, when a subscriber makes a call establishment request, the CAC analyzes the request and determines whether a connection thereto is admitted in accordance with the network state. The CAC then assigns necessary resources such as bandwidth, buffer capacity, etc., and assigns a virtual path identifier VPI and virtual channel identifier VCI in order to execute a path set function to destination. When issuing a call connection request, the subscriber suggests a source traffic descriptor comprised of traffic parameters defining various traffic characteristics and quality of services QOSs that are required for a call. The CAC must not have any effect on other subscribers who are admitted. It is also possible that the subscriber who has already admitted in making a connection to require improved services by simply re-negotiating with the network, if necessary.

The generic flow control function GEC serves to adjust a traffic flow between the B-TE 10 and B-NT2 12. That is, the most important control object of the generic flow control GFC function is to guarantee fairness of traffic toward the network and to minimize transmission delay of the delay sensitive traffic.

The usage parameter control UPC monitors whether a connection-admitted call observes previously negotiated traffic parameters; that is, whether a stream of cells representative of a call violates the previously required traffic parameters in order to prevent congestion in the network. In general, the UPC has two functions. The first function is to monitor whether some parameters describing the traffic characteristics of the cells are observed. Various algorithms have been proposed for the UPC in accordance with a monitoring method of a bucket type or a window type. The second function is to control a cell loss priority CLP bit so as to keep a cell lost ratio low. Then, after the CLP bit is set to 1 by a tag function, and if congestion occurs within the network, all tagged cells are eliminated, or otherwise, are stored into a temporary buffer for subsequent shaping function. Performance of the usage parameter control UPC algorithm is measured as follows: First, whether a function part is excellent in searching an erroneous traffic state. Second, whether a monitoring time interval is selected. Third, how fast is the response speed. Finally, how easily can the UPC algorithm be implemented. However, the UPC should also consider whether the quality of service QOS having direct influence on the traffic of the subscriber is guaranteed and resource is varied in accordance with circumstances.

Typical algorithms of the usage parameter control UPC are leaky bucket, jumping window, and moving window types. In addition to these, there are various algorithms which are made by modifying existing methods such as shaping, varying window time, etc.

The source traffic descriptor and quality of service QOS are suitably defined for the connection admission control CAC and using parameter control UPC. The source traffic descriptor contains source traffic parameters with traffic characteristics that are descriptive of the ATM cells. Source traffic typically uses an ON-OFF traffic in which an ON state enables a continuous generation of ATM cells and an OFF state disables the generation of ATM cells. A stepwise variable traffic in which a cell rate is a time variable and a constant bit rate traffic in which the cell rate remains unchanged may also be used.

Source traffic parameters described by the source traffic descriptor are, for example, a maximum cell rate, average cell rate, burstiness cell rate, and mean cell duration. Further, the quality of services QOSs are a cell loss ratio, cell delay, and cell delay variation may also be included. In order to satisfy a grade of service GOS and the QOS, the resource management RM function serves to assign resources necessary to execute transmission function, switching function, and control function. A necessary resource for this end is provided with a transmission bandwidth and a buffer capacity according to a transmission capacity. The function for assigning a resource is largely divided into two functions; first, when a call is established, a bandwidth is assigned by the CAC function and second, after a call is already connected, a bandwidth assignment request occurring during service, i.e., a bandwidth request occurring by the UPC function is managed within real time.

To easily and simply execute the resource management RM function as well as correct control function for transmitted traffic, there is a method of controlling the traffic by setting a virtual path VP. In this method, when performing the CAC, admission is determined at the end terminal of a virtual path connection VPC. At this time, great speedy and case control are possible in a transmission node of traffic without requiring a control process such as the VPC. Since a switching node stores a reference table for a virtual path identifier VPI, by updating the reference table, rapid re-establishment of path is possible in the switching node. A plurality of virtual channels VC are processed in the bundle form to control a small number of the virtual path VP, thereby resulting in simplifying the overall control function. As a result, architecture of the whole network can be made to be simplified.

In the meantime, in the resource management RM, the method of assigning bandwidth is divided into peak rate assignment and statistical assignment. The peak rate assignment does not have statistical multiplexing gain, and its utilization is very low. One of typical features of the ATM transmission method is the statistical multiplexing gain. A main concern in the method is in that the quality which calls during service are not damaged with assignment of possible least bandwidth.

The UNI function constituted as FIG. 1 has an interfacing function, so that a subscriber can connect the B-ISDN and can receive a necessary service. Further, the UNI(H) shown in FIG. 1 should meet with service required by the B-TE 10 in which call connection is admitted. Main functions of UNI(H) in FIG. 1 is to distribute a proper resource to call establishment request of a subscriber, to assign the virtual path identifier VPI/virtual channel identifier VCI, to control properly the traffic in order to previously prevent congestion within the network or to recover already occurred congestion, and to maximize efficiency of a given resource to operate the whole network in an optimum state. Further, the UNI(H) is necessary to ensure the variety and flexibility for a multi media service.

However, in spite of many advantages of the ATM, development of this field has been hindered due to difficulty of correct control and complexity of implementation thereof, in case that a number of subscribers require various kinds of services.

SUMMARY OF THE INVENTION

It is therefore one object of the present invention to provide a user-network interface with a traffic control system and method for controlling traffic of incoming cell stream representative of a call upon occurrence of a call establishment request from a calling subscriber terminal in accordance with traffic parameters described by the calling subscriber terminal, by fixedly assigning a virtual path identifier on the cell in dependence on a traffic class of the subscriber traffic.

It is another object of the present invention to provide a user-network interface apparatus and method capable of integrally performing a connection admission control, usage parameter control, resource management for assigning bandwidth, signalling associated with the connection admission control, and operation and maintenance control.

It is still another object of the present invention to provide a user network interface apparatus and method which distributes a number of functions to be executed by a network to a broadband-network termination B-NT2, so that the whole load of the network necessary for controlling the traffic in real time can be reduced.

It is still yet object of the present invention to provide a user-network interface of an ATM exchange which sets some limits to diversity of services to simplify its entire construction.

In accordance to the present invention, the user-network interface includes a broadband-terminal equipment, a local exchange for assigning virtual path identifiers in accordance with traffic characteristics and processing the traffic received through the assigned virtual path identifiers and a virtual channel identifier, and a broadband-network termination disposed between the broadband-terminal equipment and the local exchange for switching, multiplexing and protocol handling of data link. The broadband-network termination comprises a connection control unit for receiving a call upon occurrence of a call establishment request from a calling subscriber terminal to be connected with another subscriber terminal, for identifying a traffic class from a plurality of classes of traffic flow of incoming cell stream representative of the call upon reception of traffic parameters described by the calling subscriber terminal, for controlling call admission in dependence upon the traffic parameters; a generic flow control unit operatively connected to said connection control unit, for analyzing a generic flow control field assigned in a cell header upon reception of the call for adjusting the flow of incoming cell stream and minimizing cell transmission delay; a traffic control unit operatively connected to said connection control unit, for making a determination of whether the incoming cell stream violates said traffic parameters described by the calling subscriber terminal and for enabling execution of cell transmission, cell shaping, and cell discarding; a switch operatively connected to said traffic control block unit, for enabling transmission of the incoming cell stream; and a statistical multiplexer having a routing look-up table, for multiplexing input of cell stream and outputting the cell stream to one of output routes upon designation of virtual path identifiers and virtual channel identifiers on the cells in dependence upon routing information from the routing look-up table.

The connection control unit is further comprised of a signalling processor for analyzing the traffic parameters described by the calling subscriber terminal and identifying a class of the stream of cells; a call admission control for enabling management of resources to the extent that quality of service is satisfied based upon the traffic parameters, and for assigning unused virtual channel identifiers contained in a virtual path of a corresponding identified class of the stream of cells; and a resource management section operatively connected to said call admission control, for managing the resources including assignment of bandwidth of the corresponding identified class of the stream of cells in dependence upon detection of a congestion state of the number of cells stored in an internal buffer of the statistical multiplexer.

The traffic control unit is further comprised of a monitor management section for monitoring the stream of cells and determining a minimum cell interval time allowed for each virtual path, for measuring a cell arrival time of the stream of cells, for storing a current cell arrival time and a previous cell arrival time, for subtracting the current cell arrival time and the previous cell arrival time to produce a window time, for determining that the stream of cells violates the traffic parameters when the window time is smaller than the minimum cell interval time; and a bandwidth management section for counting the number of cells received, storing a current cell counter value and a previous cell counter value representative of a total bandwidth value assigned to each virtual path, determining the number of cells having identical virtual path identifiers within the time window by subtracting the previous cell counter value from the current cell counter value, for determining a current usage bandwidth of a current time window time based upon the reciprocal result of dividing the number of cells having identical virtual path identifiers within the window time from the window time, and for generating a bandwidth control signal for enabling cell transmission or cell discard by comparing the current usage bandwidth of the current window time and the total bandwidth value.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENT

Figure 2:
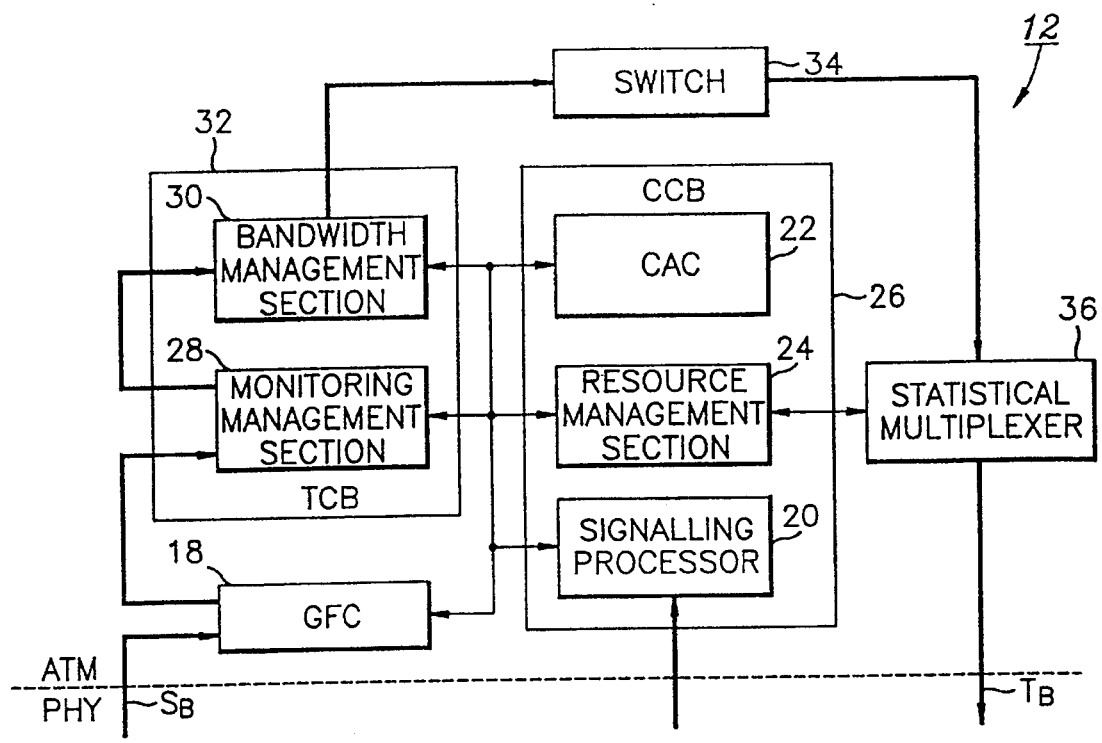
FIG. 2 illustrates a functional configuration of a broadband network termination device B-NT2 according to the present invention.

Referring now to FIG. 2, FIG. 2 illustrates a logical diagram of a broadband network termination device B-NT2 12 according to the present invention. As described earlier, the B-NT2 12 contains the most important function groups which constitute a user network interface. The B-NT2 12 is responsible for switching, multiplexing, and protocol handling of data link, and controls operations such as connection admission control CAC, generic flow control GFC, usage parameter control UPC, resource management RM, and connection control CC closely associated with an operation and maintenance OAM.

In constructing a broadband network termination device B-NT2 12 as shown in FIG. 2, a connection control block CCB 26 is employed for analyzing call establishment request information from a plurality of subscriber terminals connected physically to thereby detect traffic class, quality of service QOS and address of destination, controlling connection admission with the detected information, and simultaneously outputting transmission bandwidth information to thereby assign a virtual channel identifier VCI and to thereby supervise control information for a monitor function; a generic flow control GFC 18 is employed for analyzing information on GFC function field in a cell header by receiving a cell generated from a call established through the connection admission control to fairly use a shared media used by a plurality of terminals and for executing a function of minimizing cell transmission delay; a traffic control block TCB 32 is employed for monitoring whether respective calls connected by the connection admission control observe parameters negotiated between cells to thereby deliver information to the connection control block CCB 26 and controlling a CLP bit in a corresponding cell header and to thereby execute one of cell transmission, cell shaping, and cell discard functions; a switch 34 is connected with the traffic control block TCB 32 for switching an incoming cell stream; and a statistical multiplexer 36 is connected between an B-NT1 14 and the switch 34 via physical layer for transmitting cells by altering the VPI/VCI in the cell header modified on a basis of a routing look-up table contained within the statistical multiplexer 36.

The connection control block CCB 26 includes a signalling processor 20 for receiving and processing call establishment request information; a connection admission control CAC 22 for analyzing a traffic class of the stream of cells contained in a source traffic descriptor through the signalling processor 20 and quality of service QOS to thereby output a resource assignment request signal, and assigning non-used virtual channel identifier within an identical class if resource assignment is possible; and the resource management section 24 for responding to the resource assignment request signal of the CAC 22 to thereby manage control information for a monitoring function.

The traffic control block TCB 32 includes a monitoring management section 28 for monitoring whether respective calls connected by the connection admission control CAC 22 observe a negotiated parameter between cells by using the control information for monitoring function stored in the resource management section 24 to thereby output a bandwidth assignment/non-assignment signal, if violating the negotiated parameter, and a bandwidth management section 30 for analyzing a bandwidth being used at present of an identical class in response to the bandwidth assignment/non-assignment signal output from the monitoring management section 28 to thereby delivery the bandwidth assignment/non-assignment signal to the resource management section 24 and to thereby determine an additional bandwidth assignment, cell shaping, and cell discard.

A solid line in FIG. 2 represents a cell stream, which is up-stream toward a network; and a fine line represents the flow of control signals containing signaling. Information on an assignment possibility bandwidth is obtained by using the control information stored in the resource management section 24.

Now, details of an operation according to the construction of FIG. 2 will be discussed. First, when the connection admission control receives a call establishment request signal from a plurality of subscriber terminals connected physically, the signalling processor 20 analyzes the source traffic descriptor associated with the call establishment request signal, quality of service QOS of a source, and information oil destination address requiring a connection, and then the analyzed results are transmitted to the CAC 22. The source traffic descriptor is comprised of traffic class, together with a parameter selected in accordance with source characteristics.

The CAC 22 assigns a current non-used identifier among the virtual channel contained in the virtual path of a required class. In this case, the CAC 22 transmits to the resource management section 24 a signal for requiring determination of whether the resource is assigned to such an extent that a quality of a required service can be satisfied, based on the contents of the source traffic descriptor, before the virtual channel identifier VPI is assigned. While managing a current used resource and a residual resource in a data form, the resource management section 24 assigns resource to a possible extent in dependence upon the request of the CAC 22 and updates data on the current used resource and the residual resource.

When the resource has been assigned by the resource management section 24, the CAC 72 serves to assign the virtual channel identifier VCI and simultaneously stores the parameter for traffic control into an internal memory area. Control of the parameter is implemented by a multi rule-base structure and real time variable window algorithm. In the multi rule-base structure, a usage parameter control is executed by using pointer of traffic control routine which processes the traffic control of a corresponding class stored in the multi rule-base. In the real time variable window algorithm, the usage parameter control is executed by using a minimum call interval time as a reciprocal number of a maximum cell rate. Data managed in the resource management section 24 is a maximum bandwidth of a corresponding virtual path VP, and assignment bandwidth which is currently assigned and used.

A call connected by the connection admission control of the CAC 22 performs the usage parameter control by the TCB 32, for the purpose which both the monitoring management section 28 for monitoring whether a received cell observes the negotiated parameter upon the connection admission control, and the bandwidth management section 30 for detecting whether a bandwidth assignment to a violated cell is possible, are used. In operation, if the received cell is proved to be a violated cell in the monitoring management section 28, the monitoring management section 28 transmits the bandwidth assignment/non-assignment signal to the bandwidth management section 30. Thereafter, the bandwidth management section 30 detects a current subscriber bandwidth and transmits a control signal for requiring determination of whether the resource of a necessary amount for a current cell is assigned, to the resource management section 24. Here, the resource management section 24 detects a residual resource to thereby transmit a permission or non-permission response signal to the bandwidth management section 30. In other words, if the bandwidth assignment is possible and a current state is not congested, the resource management section 24 outputs an permission response signal, and if the current state is congested, the resource management section 24 outputs a non-permission response signal. Such a congestion state is determined in accordance with the number of cells stored in an internal buffer of the statistical multiplexer 36. That is, if the number of cells stored in the internal buffer of the statistical multiplexer 36 is over a predetermined threshold value and the congestion occurring within the network is notified through the operation and maintenance OAM function, the network is considered to be in a congestion state. In this case, the resource management section 24 responds to the violated cell with the non-permission response signal. Here, if receiving the permission response signal, the cell is transmitted, after the CLP bit in the cell header is set to 1, and a cell receiving the non-permission response signal is discarded or is stored in the buffer to be processed by a shaping function. Then through the switch 34 having an automatic path routing function, the cell which passes the TCB 32 is stored in the buffer of the statistical multiplexer 36 in order to be processed.

Figure 3:
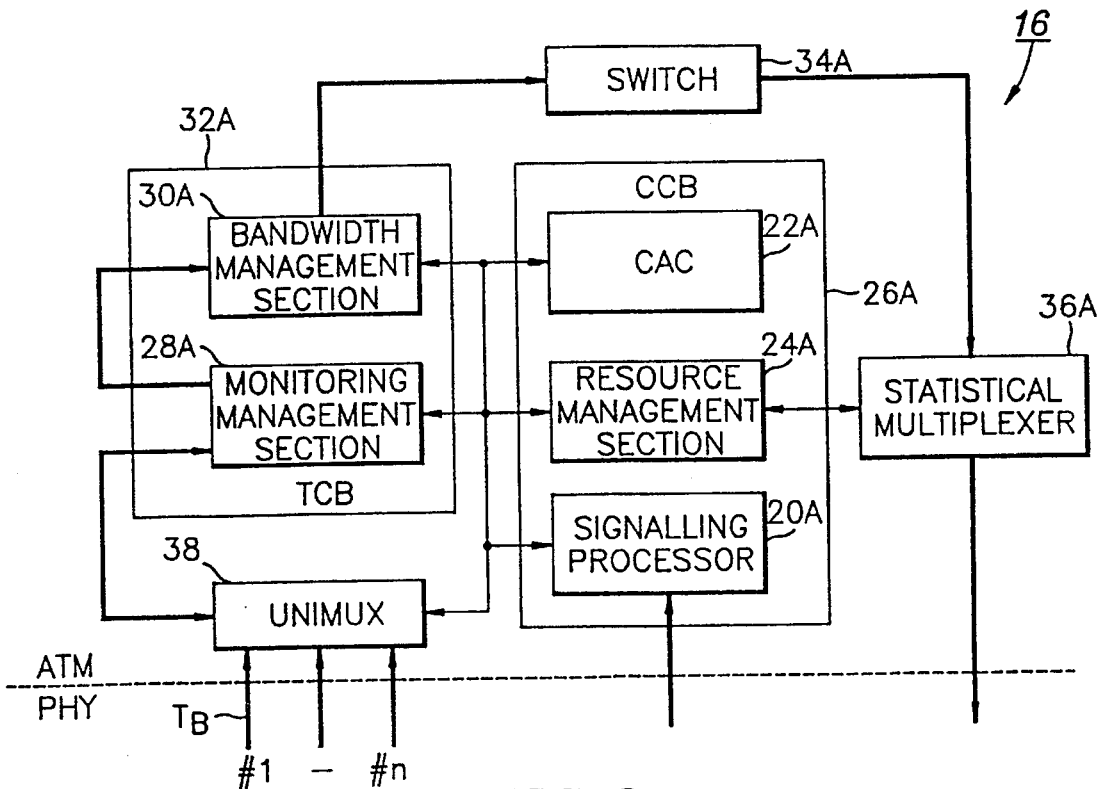
FIG. 3 illustrates a functional configuration of a local exchange LEX according to the present invention.

FIG. 3 is a block diagram showing a construction of a local exchange LEX according to the present invention, which has a construction similar to the B-NT2 12 of FIG. 2. However, the only difference between these constructions lies in that the function of the GFC 18 is controlled in each B-NT2 12 and is replaced by an UNI statistical multiplexer UNI MUX 38 performing a function for multiplexing a cell stream transmitted from the B-NT2 via the B-NT1 14 into a single cell stream. Each reference numeral of FIG. 3 is indicated by alphabet Letter "A" being added to each reference numeral of FIG. 2. Hence, it is understood that a multiplexing function to a plurality of the user-network interface determines its multiplexing rate on traffic control process capability.

In each cell stream input to the UNI MUX 38 in the LEX 16, four VPIs by classes are assigned to a single UNI. The VCI contained in the VPI of a corresponding class is dynamically assigned by the connection admission control function performed in the B-NT2 12 at the time when the connection admission control is made. However, since the VPI is fixedly assigned, based on traffic class of the B-NT2 12, the connection admission control function of LEX 16 serves to route a path reaching a destination, and determines and assigns the amount of the resource necessary for the path. Hence, load is distributed to the B-NT2 12 and LEX 16. If the connection establishment is received, the B-NT2 12 is notified about the fact that the connection establishment is received, and simultaneously, parameter values of the virtual path containing the connection are stored in an internal storage area for the usage parameter control.

The monitoring function and bandwidth assignment function performed in the TCB 32A execute the control for the VPI fixedly assigned in the B-NT2 12, while the B-NT2 12 executes the control for the VCI assigned in each terminal. Therefore, the load for controlling the cell stream transmitted via the B-NT1 14 can be reduced in a plurality of B-NT2 12, and the control for the cell stream to the B-NT2 12 and LEX 16, in the method that the load is dispersed in two step form is executed.

The switch 34A is constituted as a switching device for a routing, having m output cell streams against "k" input cell streams. Here, "k" represents the total number of control function blocks and "m" is determined by the quantity of an output transmission link. And a single traffic control function portion executes a control function a single physical cell stream from UNI MUX 38. As a result, the TCB 32A is necessary for the "k" input cell streams from UNI-MUX 38, and a single TCB 32A is necessary to be connected with "n" UNIs.

Figure 4:
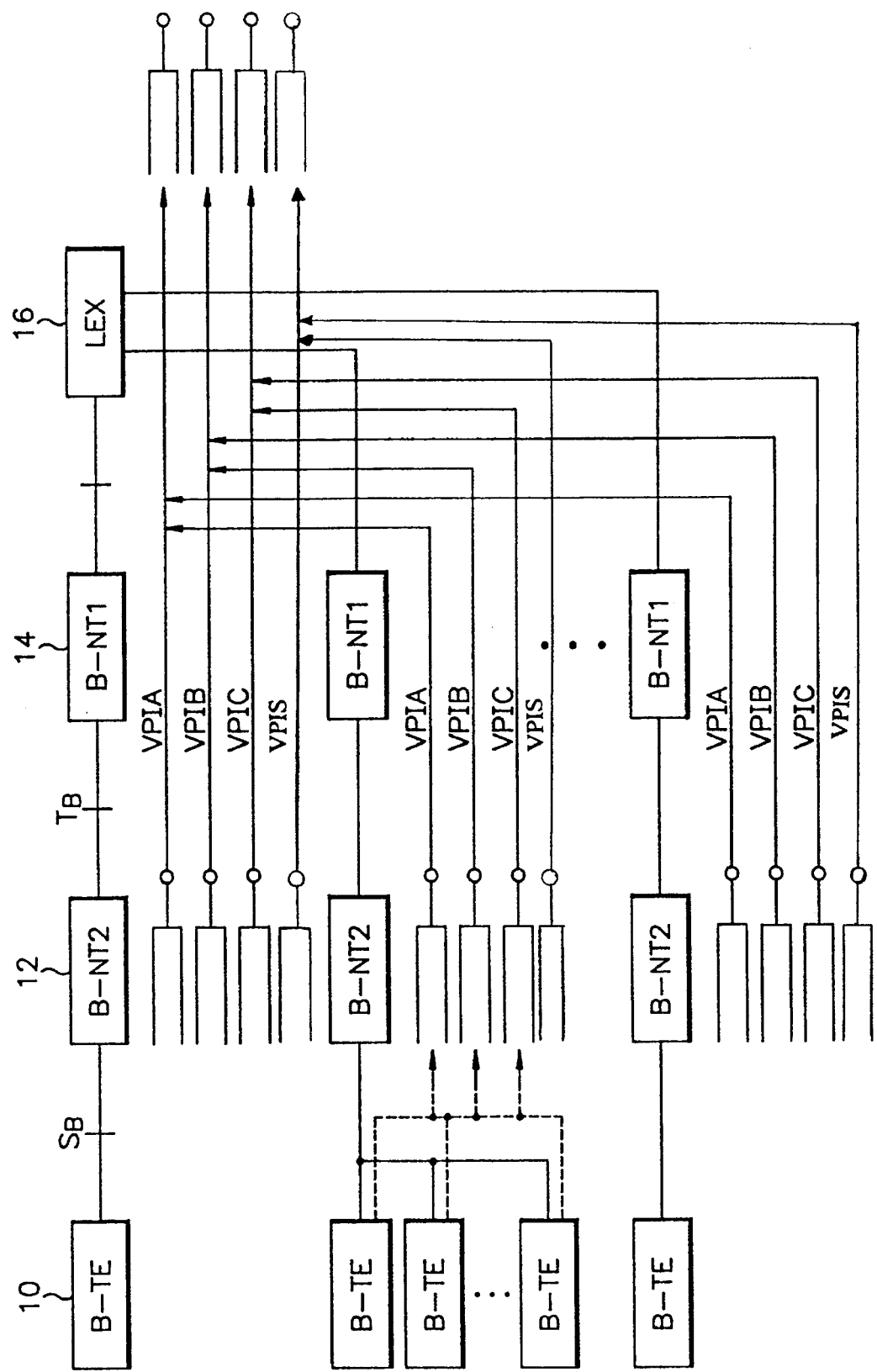
FIG. 4 illustrates a physical configuration of a user-network interface with assignment of a virtual path identifier and a virtual channel identifier on logical channels according to the present invention.

FIG. 4 is a block diagram showing assignment of a virtual path identifier VPI and a virtual channel identifier VCI according to the present invention, in which service class is divided, based on the division reference of the traffic of the B-NT2 12, and the VPI within a corresponding area is fixedly assigned in accordance with the divided service class.

The division reference of service class according to the traffic division is given by the following Table <1>:

TABLE <1>

| Division Class | Division Reference | An Example of Traffic |
| --- | --- | --- |
| Class A | Delay Sensitivity Loss Sensitivity | Voice |
| Class B | Delay Sensitivity | Real Time Image Service |
| Class C | Loss Sensitivity | General Data |

Figure 1:
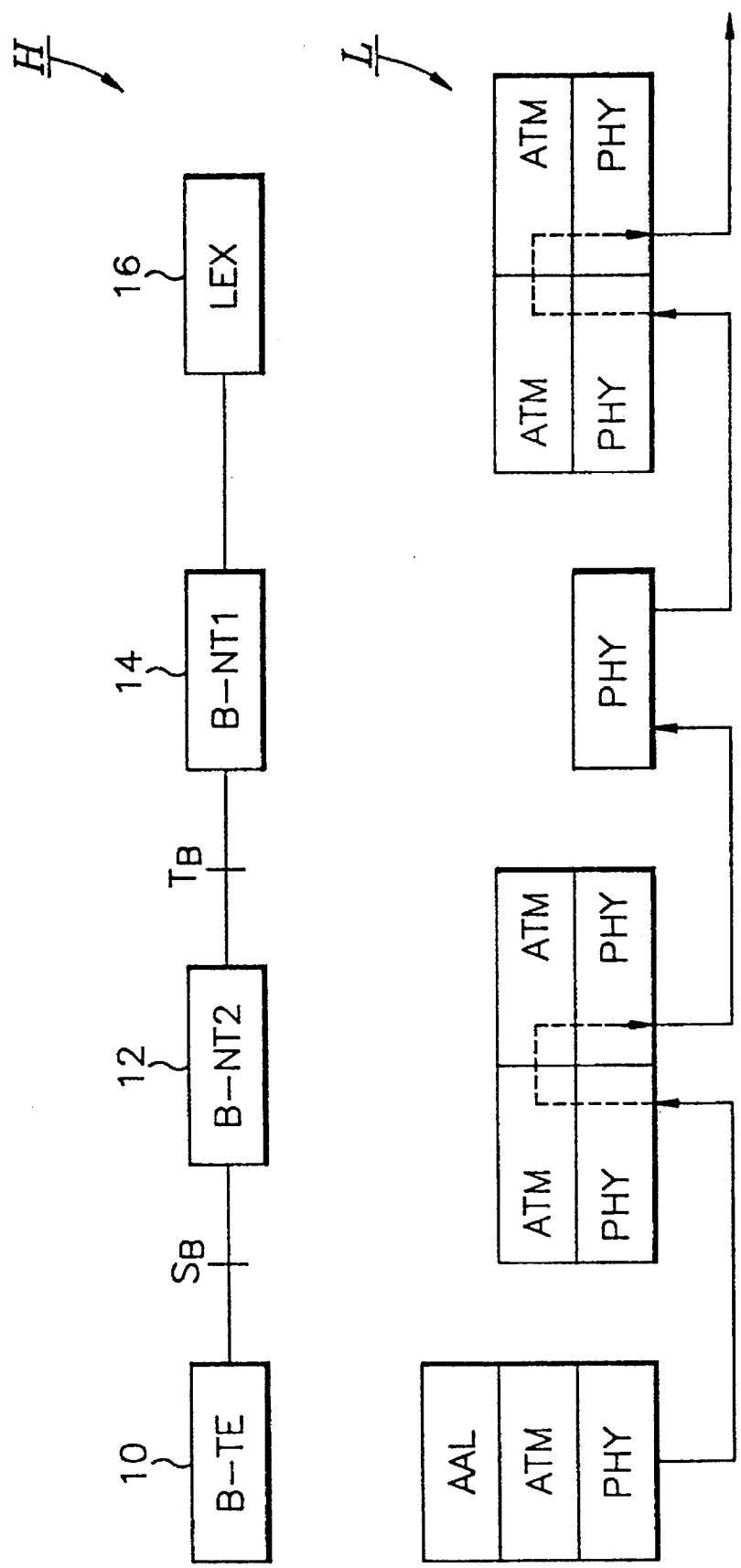
FIG. 1 illustrates a physical configuration of a user-network interface recommended by CCITT Recommendation 1.413.

The reason why the service class is divided as shown in FIG. 1 is as follows. A source traffic used in the B-ISDN is largely divided into different traffic classes respectively representative of voice data such as telephone service, general digital data, and an image signal, for example, a still image and moving picture. A voice source such as a telephone is needed to be transmitted within the real time, having a fixed cell rate and sensitively responds to a loss. For such a source traffic having delay sensitivity and loss sensitivity which is not capable of performing a smooth communication, if any delay and loss occur, so, class "A," a highest grade should be allowed.

When a moving picture source such as a television is transmitted in the real time, it is usually sensitive to transmission delay. However, for such a moving picture source traffic having delay sensitivity permits the loss to a certain extent, class "B," i.e., a higher grade should be allowed.

Finally, a general data is usually not sensitive to the delay, but is sensitive to the loss. For such general data, class "C" should be allowed.

The VPI is commonly constituted as 8 bits, but in the present invention by using a low level of 2 bits the virtual path identifiers VPIA, VPIB, VPIC, and VPIS for distinguishing different classes of the source traffics signalling function and operation and maintenance OAM function are determined. Four fixed identifiers, including the virtual path identifier VPIA, VPIB, and VPIC for each traffic class as shown in FIG. 4 and an exclusive identifier VPIS performing the signalling and maintenance functions, are assigned to a smallest structure of a user-network.

Figure 5:
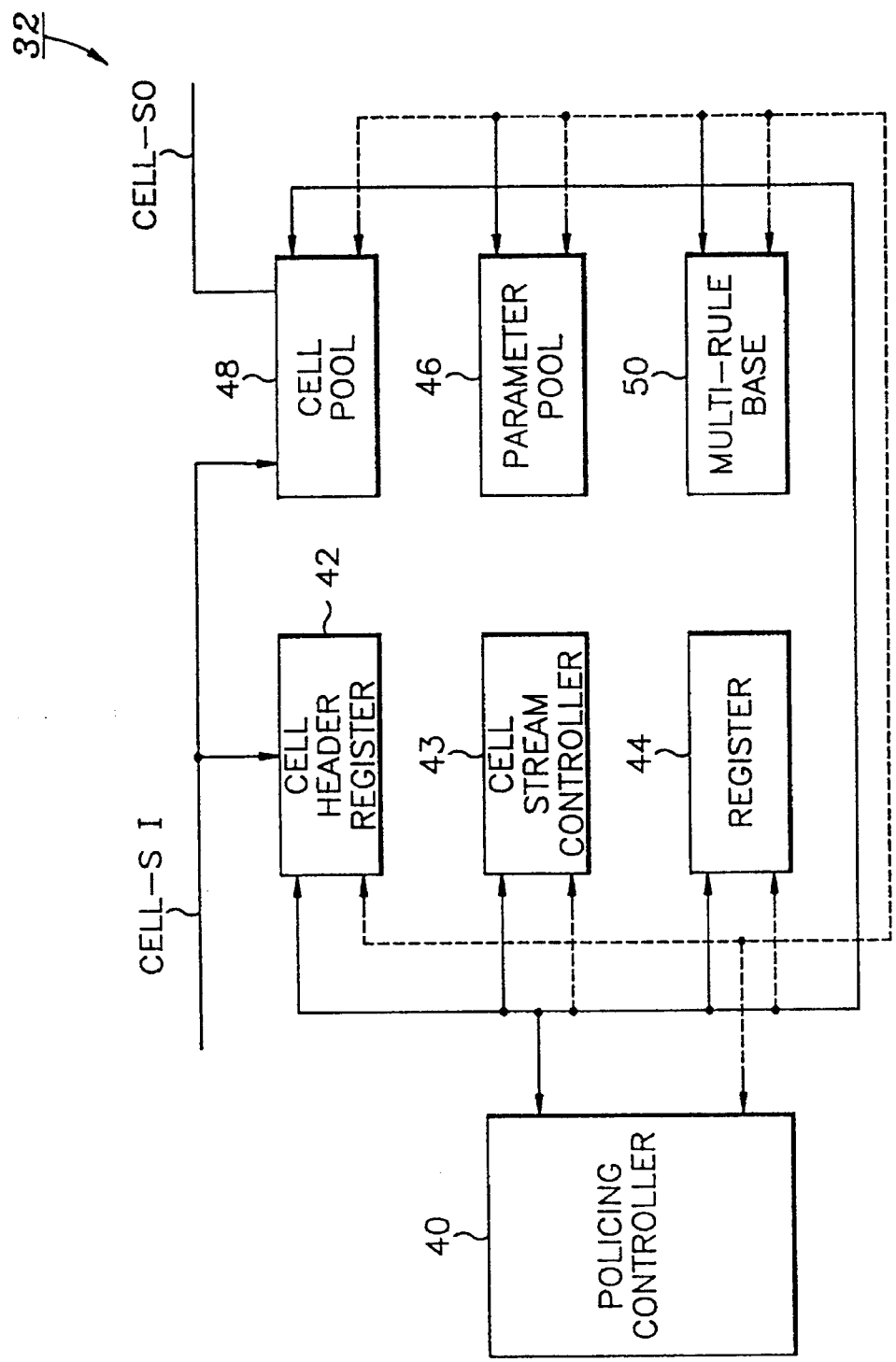
FIG. 5 illustrates a physical configuration of a traffic control block TCB according to the present invention.

FIG. 5 illustrates a physical configuration of a traffic control block TCB 32 according to the present invention. In FIG. 5, the traffic control block TCB 32 comprises a multi rule-base 50 for storing policing routines by classes for performing an optimum control according to the traffic characteristic, and control program for signalling function and operation and maintenance OAM function to thereby output the policing routines and control program by a given control; a parameter pool 46 for storing a process routine pointer for each traffic class and various kinds of parameters for traffic control to thereby output the process routine pointer and parameters by a given control; a cell header register 42 for storing a header of a cell stream received by a given control; a cell pool 48 for storing and outputting a cell stream received in response to the input of cell control information, buffering and discarding the received cell stream; a cell stream controller 43 for outputting the cell control information corresponding to the input of cell policing result information; a policing controller 40 for controlling the cell header register 42 in response to an input of a primitive transmitted from a physical layer to store a cell header and simultaneously controlling the multi rule-base 50 and parameter pool 46 to perform traffic control routines for different traffic classes of a stream of cells using various kinds of parameters in order to output the cell process result information to the cell stream controller 43; and a register file 44 constructed as a pile of registers for storing the various kinds of parameters by the control of the policing controller 40.

The cell pool 48 of the construction of FIG. 5 is a FIFO circuit constructed with a shift register which shifts cell stream having the length of 53 bytes. The storage volume of the cell pool 48 is made up of the size of two cells, in which one performs a general function, and the other is for buffering function performed in the policing routine for a loss sensitive traffic leveled class "C." The parameter pool 46 and multi rule-base 50 may be constructed as a single memory. It is apparent to those skilled in the art that the multi rule-base 50 may be formed by software or hardware. The parameter pool 46 of FIG. 5 is a functional block contained in the resource management section 24.

Figure 6:
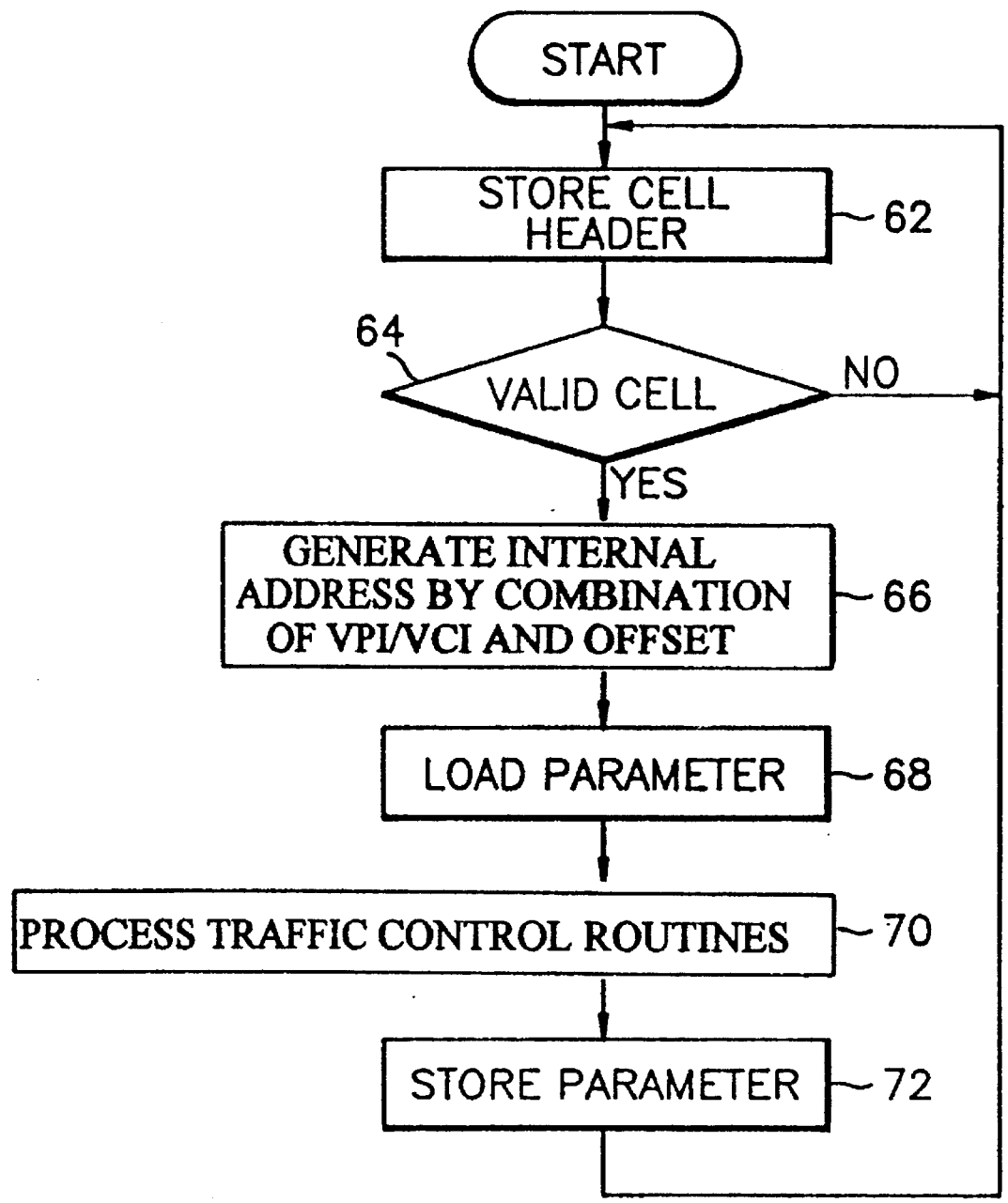
FIG. 6 illustrates a traffic control process according to the present invention.

FIG. 6 illustrates a traffic control process according to the present invention, which is an operational flow chart of the policing controller 40 shown in FIG. 5. In order to control the traffic, the header of a current received cell in response to the input of the primitive from the physical layer is stored. Then, if the cell is a valid cell, a traffic parameter loading step of generating an address by the combination of the VPI, VCI, and an offset occurring of its own accord is taken to load the various kinds of parameters, and then the traffic control step to a corresponding class is executed by using a pointer for designating a policing routine by classes contained in the loaded parameter. As a result, the traffic process step for different traffic classes updates and restores the loaded parameter.

Figure 7:
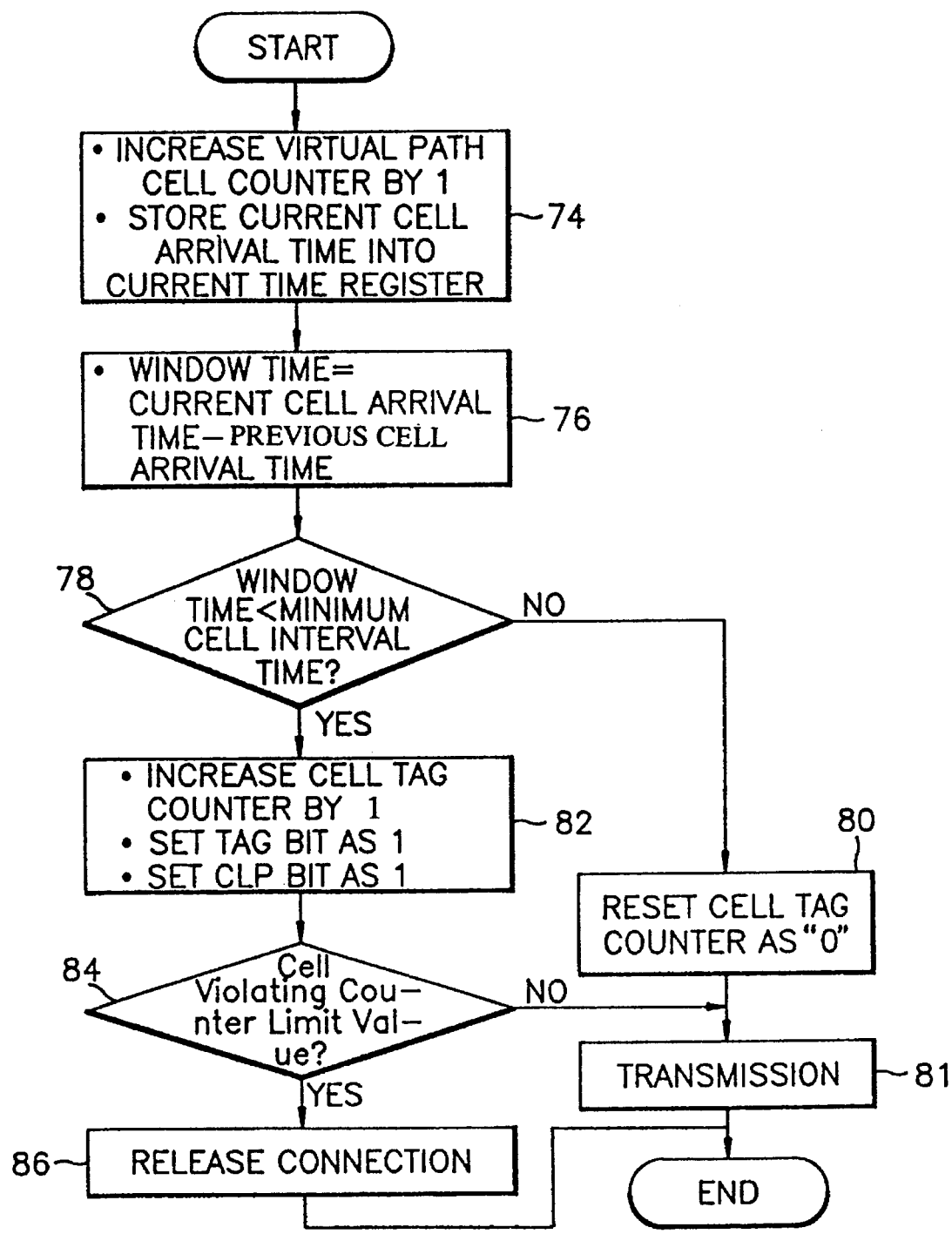
FIG. 7 illustrates a traffic control routine for traffic control a stream of cells of class "A" indicative of voice data by the policing controller of FIGS. 5 and 6.
Figure 8:
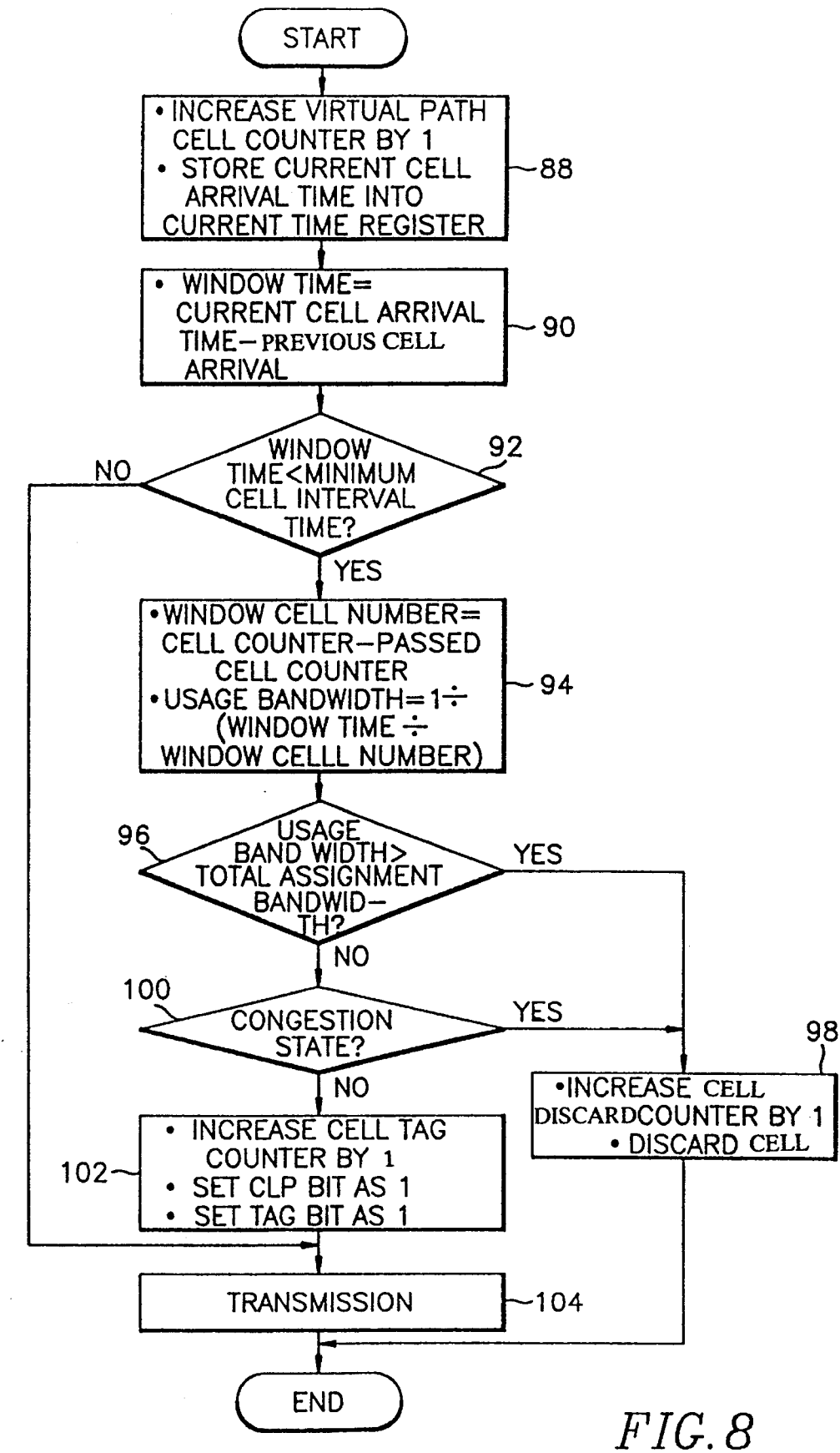
FIG. 8 illustrates a traffic control routine for traffic control a stream of cells of class "B" indicative of real time image data by the policing controller of FIGS. 5 and 6.
Figure 9:
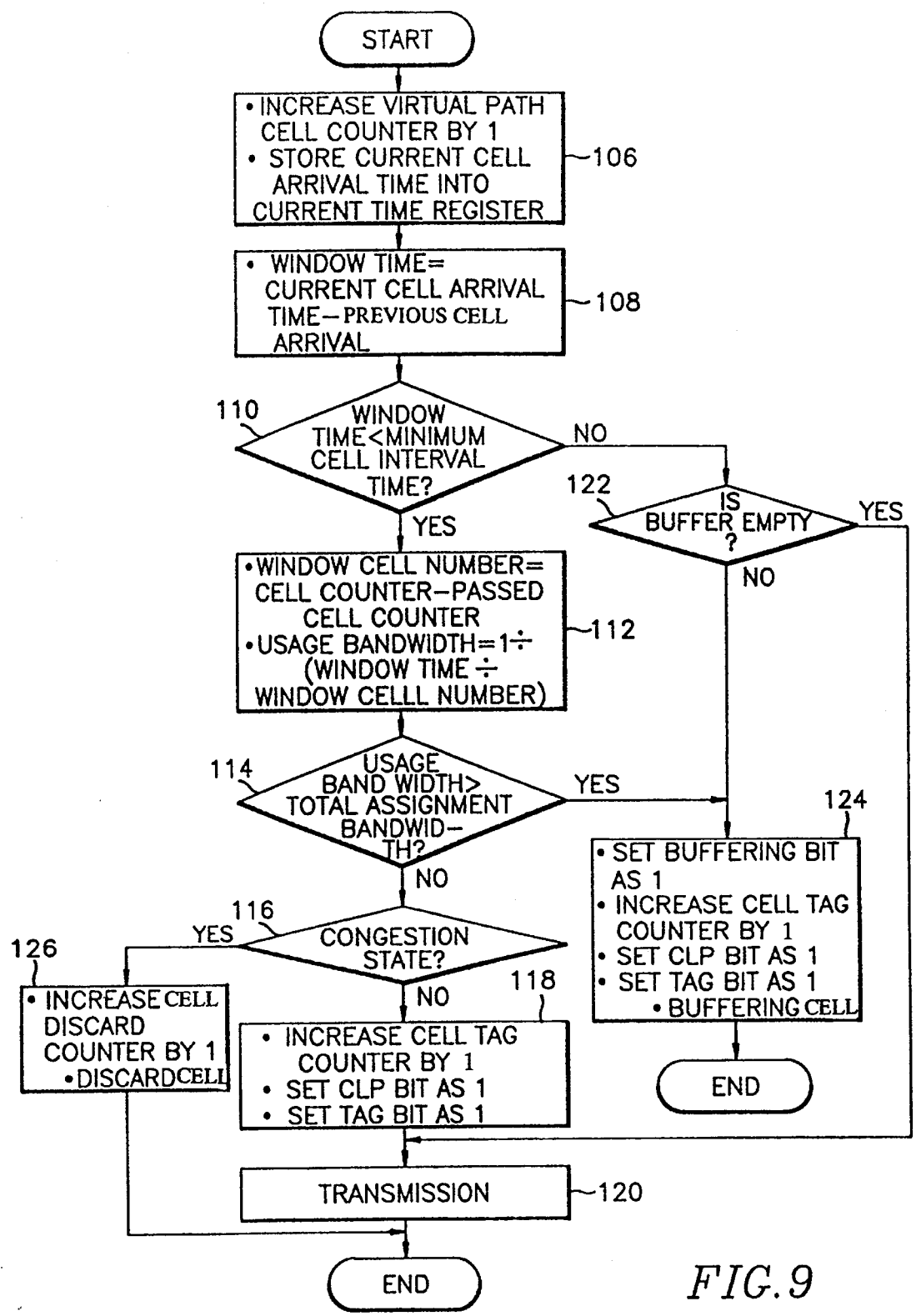
FIG. 9 illustrates a traffic control routine for traffic control a stream of cells of class "C" indicative of general data by a policing controller of FIGS. 5 and 6.

FIGS. 7 to 9 are flow charts showing different traffic control routines for each of the classes "A," "B," and "C" stored into the multi rule-base 50. Specifically, FIG. illustrates a traffic control routine for traffic control a stream of cells of class "A" indicative of voice data by the policing controller of FIGS. 5 and 6; FIG. 8 illustrates a traffic control routine for traffic control a stream of cells of class "B" indicative of real time image data by the policing controller of FIGS. 5 and 6; and similarly, FIG. 9 illustrates a traffic control routine for traffic control a stream of cells of class "C" indicative of general data by a policing controller of FIGS. 5 and 6.

Figure 10:
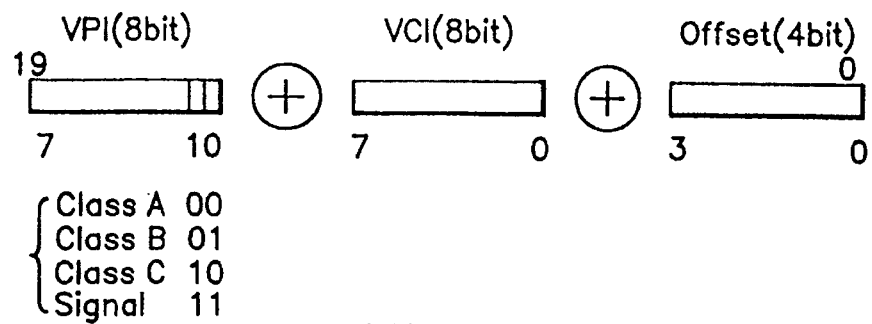
FIG. 10 illustrates a data map with address combination for traffic control of a virtual channel within a virtual path according to the present invention.

FIG. 10 is a data map showing address combination for traffic control of virtual channel within a virtual path according to the present invention, which indicates an example of combination of the VPI and VCI stored in the current received cell header and the offset occurring of its own accord in the policing controller 40. Here, the VPI is made up of 8 bits, of which, the lower level of 2 bits are used to divide class and a signalling virtual path, and the state designated by the lowest 2 bits thereof is shown in FIG. 10. Thus, even though the VCI has 8 bits, the bit size may be varied depending upon the size of the network and the structure of an address bus in the TCB shown in FIG. 5. The offset is made up of 4 bits, and thus has 16 designated parameters as a result of the various combination of 4 bits.

Figure 11:
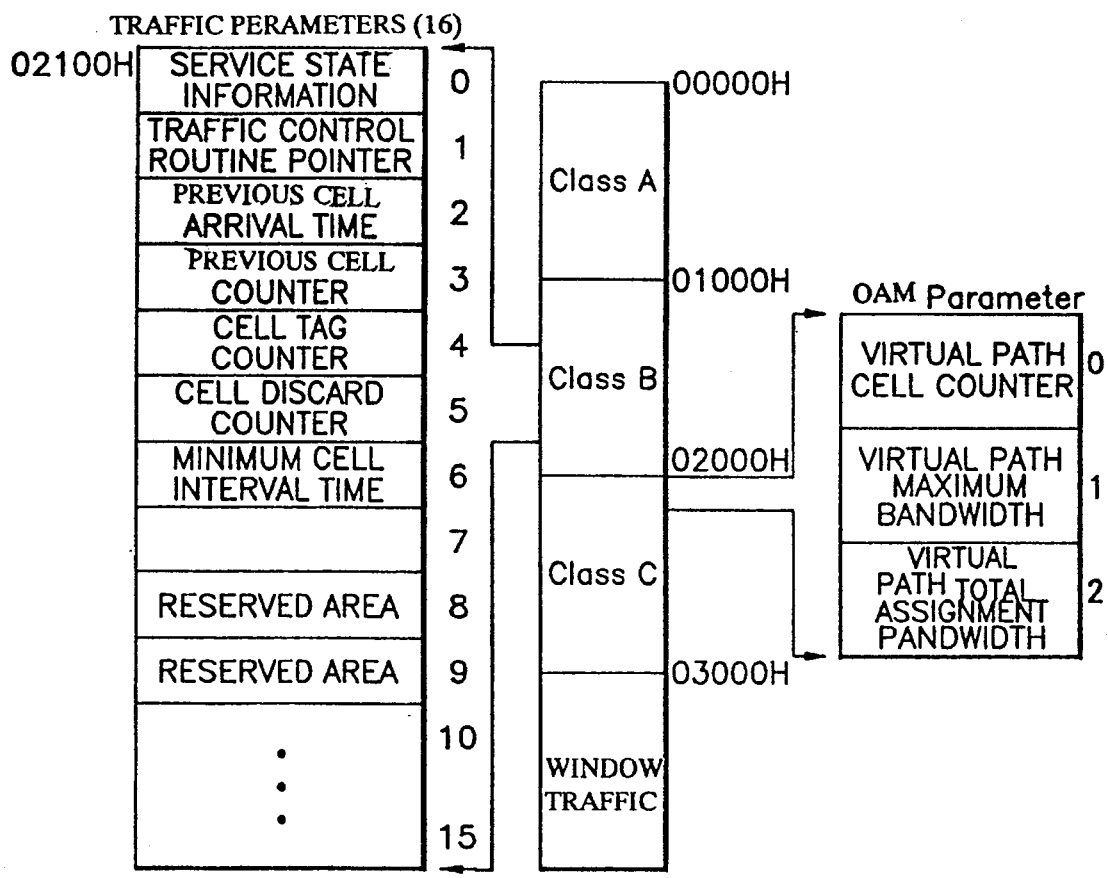
FIG. 11 illustrates a memory map of a parameter pool and multi rule base according to the present invention.

FIG. 11 illustrates a memory map of a parameter pool 46 and a multi-rule base 50 according to the present invention, which represents an example made when a traffic parameter of classes as the parameter pool 46 and traffic control routine by classes as the multi-rule base 50 are constituted as one memory. In FIG. 11, the traffic parameter for each class is composed of service state information, a traffic control routine pointer, a previous cell arrival time, a previous cell counter to a corresponding path, a cell tag counter, a cell discard counter, a minimum cell interval time, and a reservation area. A parameter for operation and maintenance OAM function of a corresponding class is stored into an initial area of respective classes, that is, into an area in which the VCI is number 0. In such OAM parameters, a virtual path cell counter of a corresponding class, a virtual path maximum bandwidth, and a total assignment bandwidth assigned to the virtual path are available.

The parameters mentioned above are used for monitoring the traffic and for performing the operation and maintenance OAM function, which are variable in accordance with the length of an offset. Such parameters are also used for the real time variable window algorithm. An offset number 0 of FIG. 11 serves as a control flag indicating service state to a current cell. In other words, bit number 0 of the state information is discarded, bit number 1 is buffered, bit number 2 is in a congestion state, and bit number 3 is tagged, by the unit of bit, respectively. The residual bits are used as the reservation area for a necessity afterward. An offset number 1 is the traffic control routine pointer of the multi rule-base storing a policing routine for a corresponding cell. An offset number 2 is a cell time having the VPI and VCI being identical to a current cell which stores a previous received time upon a previous policing operation. Of course, the time when the current cell is received will be stored for the purpose of controlling the next cell to be received. An offset number 3 is that of storing a cell counter value of a corresponding virtual path as parameter for performing the operation and maintenance function at the instant that a previous cell is received. The cell counter value of the corresponding virtual path should be stored for the next operation. An offset number 4 is a cell tag counter which is transmitted by setting a CLP bit within the cell header as 1. If the current cell is violated, the value of the counter will be increased by 1 and stored. An offset number 5 is a discard cell counter storing the number of cells discarded by this time. If the current cell is violated and in the case that the current state is not capable of assigning the bandwidth or bit number 2 of the service state information of the offset number 0 is in a congestion state by being set as 1, the current cell becomes discarded. The congestion state has occurred when the buffer of the statistical multiplexer MUX 36 retained by the system itself exceeds its limit value, or the congestion state has been informed by the operation and maintenance OAM function performing the recovery work of the congestion state when such a congestion state occurs. Thereafter, if the current cell is discarded, the value of the discard cell counter is increased by 1 and stored. An offset number 6 is that of storing a minimum cell interval time as a reciprocal number of a maximum cell rate required by the usage terminal generating the cell, upon the operation of the connection admission control CAC. In view of time saving and easiness of implementation, since the performance of a monitoring operation with time interval of a cell in the portion of performing the monitor operation is more advantageous than that of the monitoring operation with a cell rate by taking the reciprocal number of the time. Residual offsets are used in a reservation area in which parameters will be used for the operation and maintenance function afterward and more precise control.

Figure 12A:
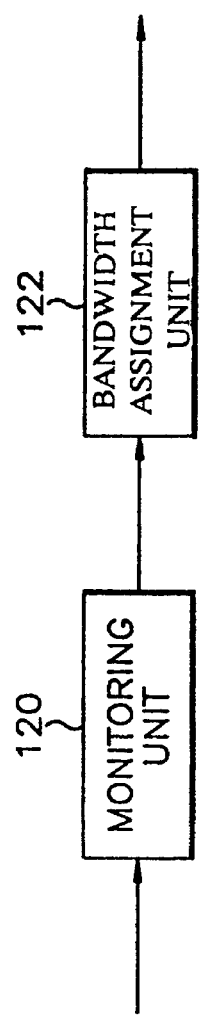
FIG. 12A illustrates a functional configuration of a real time variable window traffic control of the traffic control block TCB according to the present invention.

FIG. 12A illustrates a logical diagram of a real time variable window traffic control of the traffic control block 32 of FIG. 2 according to the present invention as comprising a monitoring unit 120 and a bandwidth assignment unit 122 operable based on software routines stored in the multi-rule base 50 and controlled by the policing controller 40 of FIG. 5. The monitoring unit 120 having a minimum cell interval time set by connection admission control CAC function, operates to store a current received cell arrival time and a previous cell arrival time generated from the same calling subscriber terminal, and calculate a window time by the following equation (1):

*window time $W_i(t-1, t)$=current cell arrival time $T_i(t)$–previous cell arrival time $T_i(t-1)$* where $T_i(t)$ represents a current cell arrival time of a channel i, and $T_i(t-I)$ represents a previous cell arrival time of the channel i, in order to compare the window time with a previously set minimum cell interval time for detecting whether an incoming stream of cells violates the traffic parameters described by the calling subscriber terminal. The bandwidth assignment unit 122 controls the bandwidth assignment of the cell by storing a previous cell counter value and a current cell counter value indicative of a value of a total assignment bandwidth assigned to a virtual path containing a current cell, extracting the number of cells having an identical virtual path within the window time by the following equation (2):

*number of cells having an identical virtual path identifier in window time =current cell counter value–previous cell counter value,* and extracting a current usage bandwidth during a current window time by the following equation (3):

*current usage bandwidth during current window time=1+(window time+the number of cells having an identical virtual path identifier in the window time),* and comparing the current usage bandwidth during the current window time with the total assignment bandwidth for generating a bandwidth control signal controlling a bandwidth assignment of the current cell. The bandwidth control signal is determined as follows:

1) usage bandwidth during a current window>total assignment bandwidth =discard of current violated cell
1) usage bandwidth during a current window>total assignment bandwidth =discard of current violated cell,
2) usage bandwidth during a current window<total assignment bandwidth =tag of current violated cell for subsequent cell transmission or buffering.

Figure 13:
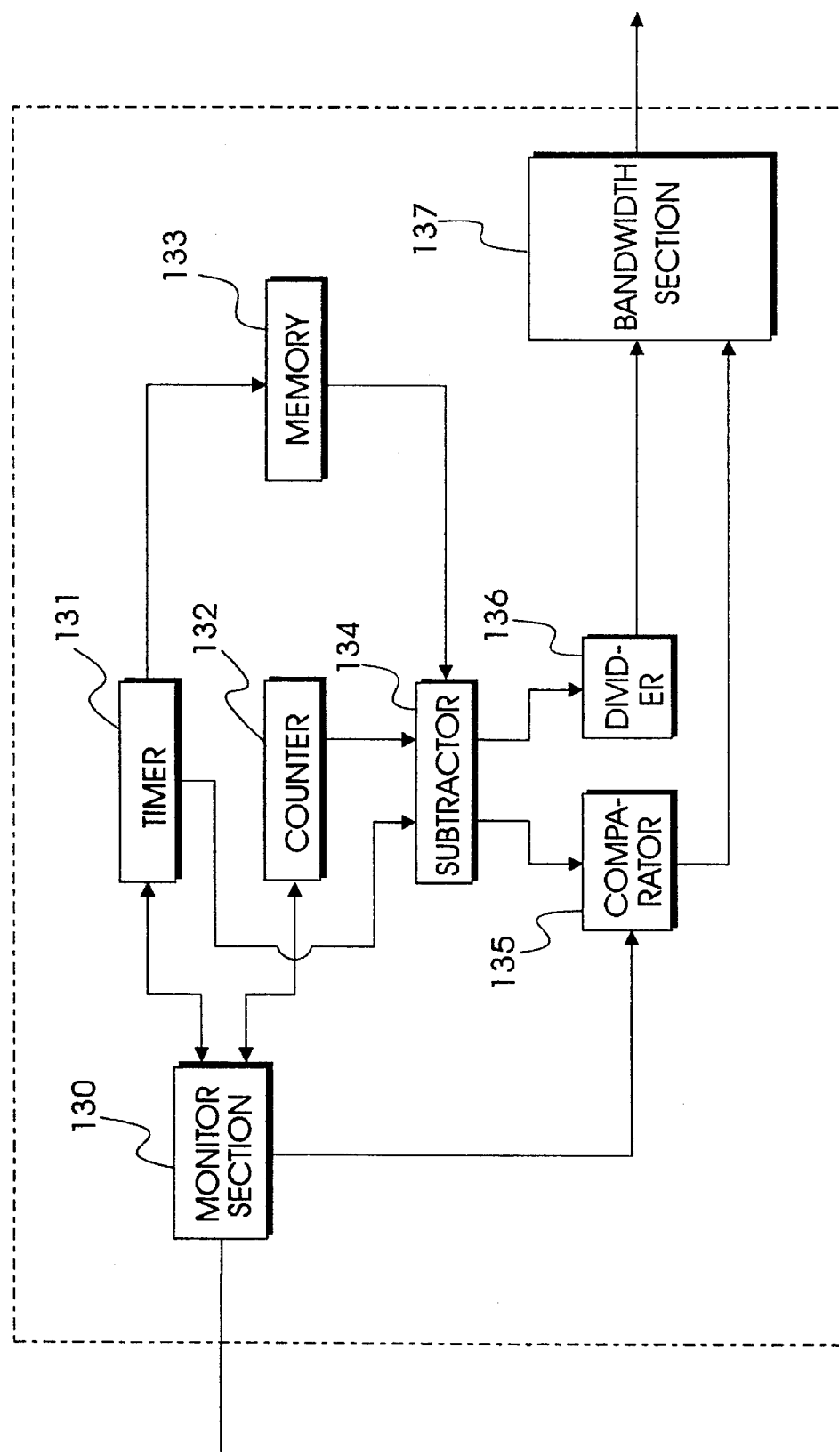
FIG. 13 illustrates another circuit embodiment of the traffic control block TCB 32 according to the present invention.

The monitoring unit 120 may be physically constructed as comprising a monitor section 130 for monitoring the stream of cells and determining a minimum cell interval time allowed for each virtual path; a timer 131 for measuring a cell arrival time of the stream of cells; a storage device 133 for storing a current cell arrival time and a previous cell arrival time; a subtractor 134 for subtracting the previous cell arrival time from the current cell arrival time to produce a window time; and a comparator 135 for comparing the window time with the minimum cell interval time and determine whether the stream of cells violate said traffic parameters by comparing the window time with the minimum cell interval time as shown in FIG. 13.

Similarly, the bandwidth assignment unit 122 may be physically constructed as comprising a counter 132 for counting the number of cells received from the monitor section; a storage device 133 for storing a current cell counter value of said counter and a previous cell counter value of the counter representative of a total bandwidth value assigned to each virtual path; a subtractor 134 for subtracting the previous cell counter value from the current cell counter value to produce the number of cells having identical virtual path identifiers within the window time; a divider 136 for dividing the number of cells having identical virtual path identifiers within the window time; and a bandwidth section 137 for determining a current usage bandwidth during a current window time from a reciprocal of a result of said divider and for generating a bandwidth control signal by comparing the current usage bandwidth during the current window time and the total bandwidth value, wherein the bandwidth control signal controls cell discard when the current usage bandwidth during the current window time is greater than the total bandwidth value, and controls cell transmission when the current usage bandwidth during the current window time is not greater than the total bandwidth value as shown in FIG. 13.

Figure 12B:
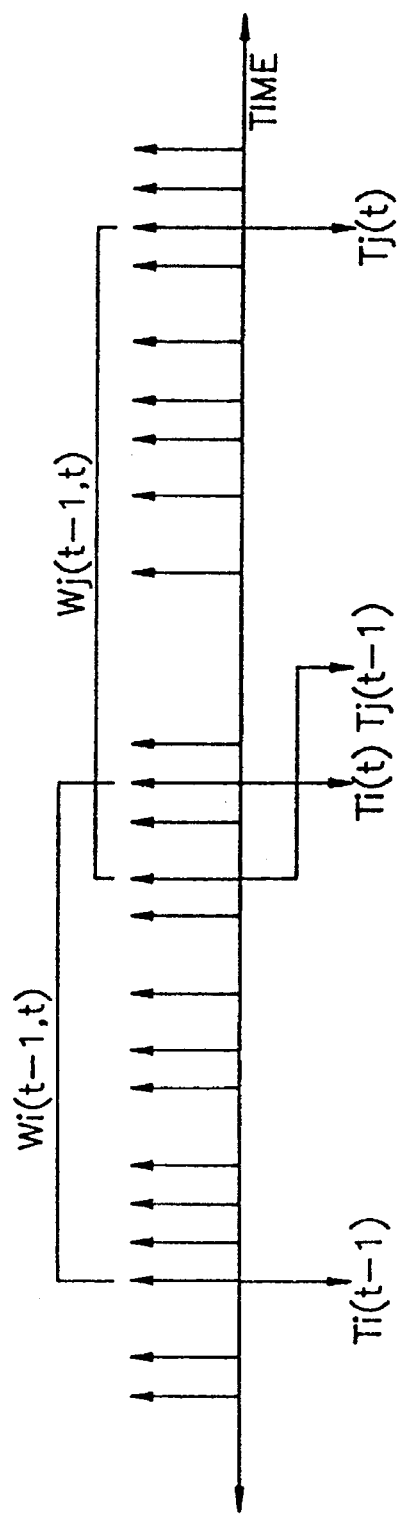
FIG. 12B illustrates an operation of the real time variable window traffic of FIG. 12A.

FIG. 12B illustrates an operation of the real time variable window traffic control of FIG. 12A where $T_i(t-1)$ represents a previous cell arrival time of a channel number i, and $T_i(t)$ represents a current cell arrival time of the channel number i. Similarly, $T_j(t-1)$ represents a previous cell arrival time of a channel number j, and $T_j(t)$ represents a current cell arrival time of the channel number j. Also, $W_i(t-1, t)$ represents a current window time of the channel number i, and $W_j(t-1, t)$ represents a current window time of the channel number j.

An explanation of the preferred embodiment of a traffic control by classes according to the present invention will be described hereinafter, assuming that four virtual path identifiers VPIA, VPIB, VPIC, and VPIS as mentioned in FIG. 4 are assigned to the B-NT2 12 of the UNI as constructed in FIG. 1.

If a call establishment request signal is generated from a calling subscriber terminal, the CAC 22 analyzes the signal transmitted from signalling processor SP 20 to assign a required resource and the non-used VCI of a corresponding class, and stores and manages various kinds of parameters for the traffic control.

The policing controller 40 in the TCB 32 controls the cell header register 42 in response to the input of primitive transmitted from the physical layer to store a cell header from the stream of cells CELL-SI currently received at step 62 of FIG. 6. At this time, the cell header received is stored into the cell pool 48. Then, at step 64, the policing controller 40 analyzes the VPI and VCI of the stored cell header to detect whether or not the cell is a valid cell. If the cell is proved to be the valid cell, at step 66 the policing controller 40 generates offset for separating parameter, and generates address for accessing the parameter pool 46 by combining the VPI and VCI in the cell header and offset generated by the policing controller 40 to thereby supply the address to the parameter pool 46. At this time, the parameter pool 46 outputs parameter stored in the same form as FIG. 11 as the position of the input address. At step 68, the policing controller 40 loads the parameter output from the parameter pool 46 to the register file 44. The policing controller 40 performs traffic control routine of the corresponding class designated from the traffic control routine pointer among parameters which are loaded to the register file 44, at step 70.

Thereafter, the traffic control routine executes policing corresponding to the classes "A," "B," and "C" as shown in FIGS. 7, 8, and 9 in accordance with the designation of the traffic control routine pointer. For example, if a current traffic class corresponds to class "A," the policing controller 40 diverges to step 74 of FIG. 7. The policing controller 40 increases one value of the virtual path cell counter stored in the register file 44 and stores the current cell arrival time into the current time register at step 74. At step 76, the policing controller 40 extracts window time of the current received cell by subtracting the passed cell arrival time in the register file from the current cell arrival time, by the equation 1 as mentioned above. The policing controller compares, at step 78, the window time with the minimum cell interval time stored in the register file 44 to thereby detect whether the current received cell is violated. As a result, if the cell is not violated, the policing controller 40 resets the cell tag counter stored in the register file to "0," and transmits the current cell at step 81. On the other hand, if the cell is violated, the policing controller 40 increases one value of the cell tag counter stored in the register file 44 to thereby count the violated times and simultaneously to set the tag bit of the service state information parameter and the CLP bit in the cell header, at step 82. And at step 84, the policing controller 40 compares the cell tag counter with a limit value, and if the cell tag counter exceeds the limit value, the policing controller 40 releases the connection at step 86, which is regarded as a continuous violated cell occurring purposely. However, if the cell tag counter does not exceed the limit value, the policing controller 40 transmits the current cell at step 81.

As discussed above, the traffic control routine for class "A" is necessary to execute the control operation in order to minimize the delay and loss sensitivity. Hence, traffic bandwidth assignment for the stream of cells of class "A" operates at a maximum cell rate. In this case, even when all cells received violate the traffic parameters, the cells are transmitted without delay. However, if the violated cells are continuously transmitted till exceeding a predetermined limit value, the cells release connection thereof as not that the cells are violated by variability of the network such as effect of jitter, but that the cells are violated intentionally by subscriber terminal.

If the value of the traffic control routine pointer stored in the register file 44 is designated to the class "B," the policing controller 40 diverges to step 88 of FIG. 8. Here, the policing controller 40 executes operations of steps 88, 90, and 92 of FIG. 8 in the same manner as FIG. 7 to detect whether the current cell violates the traffic parameters. That is, the policing controller 40 extracts window time by monitoring the current cell, and at the step 92, compares the window time with the minimum cell interval time stored in the register file 44 to detect whether the current received cell violates the traffic parameters. In this case, if the current received cell is not violated, the policing controller 40 transmits the current cell at step 104. If the current received cell is violated, however, at step 94 the policing controller 40 extracts the number of cells in the window time and the current usage bandwidth by using the current cell counter value and the previous cell counter value stored in the register file 44, by equations 2 and 3 as mentioned above. Thereafter, the policing controller 40 compares the usage bandwidth of the current cell with the total assignment bandwidth stored in the register file 44 as the value of the total assignment bandwidth assigned to all virtual channels admitting connection which are contained in the virtual path to thereby detect whether the current usage bandwidth of the current cell exceeds the total assignment bandwidth, at step 96. As a result, if the current usage bandwidth of the current cell exceeds the total assignment bandwidth, the policing controller 40 determines that an additional bandwidth is not assigned due to the current state, and increases one value of the discard cell counter, thereby discarding the current cell, at step 98. If the current usage bandwidth of the current cell does not exceed the total assignment bandwidth, however, the policing controller 40 detects whether the current state is congested, at step 100. If the current state is congested, the policing controller 40 reverts to the step 98 to discard the current cell. If the current state is not congested, however, the policing controller 40 sets the tag bit in the parameter pool and CLP bit in the cell header in order to firstly discard the current cell when the congestion state occurs at step 102, and increases one value of the tag cell counter to thereby transmit the current cell at step 104.

The control operation for the delay sensitivity as known from the above is executed in FIG. 8. That is, if an additional bandwidth assignment is possible to the violated cell, and the current state is not congested, the policing controller 40 tags the tag bit and the CLP bit and transmits the cell, but if the additional bandwidth assignment is not possible to the violated cell or the violated cell is congested, the policing controller 40 discards the cell.

In the meanwhile, if the value of the traffic control routine pointer stored in the register file 44 is designated to the class "C," the policing controller 40 diverges to step 106 of FIG. 9. Here, the policing controller 40 executes operations of steps 106, 108, and 110 of FIG. 9 in the same manner as FIG. 7 to detect whether the current cell is violated. In this case, if the current cell is not violated, the policing controller 40 detects at step 122 that a second cell storage buffer within the cell pool 48 is empty. If the cell pool 48 is empty, the policing controller 40 transmits current cell stream at step 120. However, if the cell pool 48 is not empty, the policing controller 40 sets a buffering bit, a tag bit in the parameter pool, and a CLP bit in the cell header and buffers the current cell at step 124.

Moreover, if the current cell violates the traffic parameters at step 110, the policing control 40 extracts the number of window cells and usage bandwidth by using the cell counter and the passed cell counter stored in the register file 44, by the equations 2 and 3 as mentioned above. Thereafter, the policing controller 40 compares the usage bandwidth of the current cell with the total assignment bandwidth stored in the register file 44 as the value of the total assignment bandwidth assigned to all virtual channels receiving the service which are contained in the virtual path to thereby detect whether the current usage bandwidth of the current cell exceeds the total assignment bandwidth, at step 114. As a result, if the current usage bandwidth of the current cell exceeds the total assignment bandwidth, the policing controller 40 jumps on to the step 124 and sets buffering bit, tag bit, and CLP bit to thereby buffer the current cell.

If the usage bandwidth of the current cell does not exceed the total assignment bandwidth, however, the policing controller 40 detects whether the current state is congested, at step 116. If the current state is congested, the policing controller 40 proceeds to the step 126 to discard the current cell. If the current state is not congested, however, the policing controller 40 sets the tag bit and CLP bit in order to firstly discard the current cell when the congestion state occurs at step 118, and increases one value of the tag cell counter to thereby transmit the current cell at step 120.

The control operation for the loss sensitivity as shown from the above is executed in FIG. 9. That is, if an additional bandwidth assignment is possible to the violated cell, the policing controller 40 tags the tag bit and the CLP bit and transmits the cell, but if the additional bandwidth assignment is not possible to the violated cell or the current state is congested, the policing controller 40 performs a shaping function by using a buffer.

The policing controller 40, which performs the traffic control of the corresponding class by executing the traffic control routine by classes as illustrated in FIGS. 7, 8, and 9, repeatedly implements the step of storing to the parameter pool 46 newly updated parameters by the control step 72 of FIG. 6. Since such a control in FIG. 6 performs the control of received cells at the maximum speed of 150 Mbps (at the speed of 155.520 Mbps, in the physical layer) in the real time, the control for one cell currently received should be completed within about 2.82 μsec.

As disclosed above, the present invention is capable of improving cell transmission efficiency by simply controlling the characteristics of traffic classes.

An explanation for the process of the real time variable window algorithm of the traffic will be given in detail with reference to FIGS. 12A and 12B. When a cell having a certain virtual path identifier and virtual channel identifier is input to the monitoring unit 120, the monitoring unit 120 obtains a current cell input time difference as the reciprocal number of the cell rate by the calculation of equation 1 as mentioned above, and obtains a current cell rate by the difference between the current time and the previous cell input time stored in the offset number 2 of the parameter pool 46.

The window time Wi(t−1,t) becomes a time difference between the current cell arrival time Ti(t) and the previous cell arrival time Ti(t−1). The monitoring unit 120 compares whether the window time is smaller than the minimum cell interval time. If the window time is smaller than the minimum cell interval time, the monitoring unit 120 determines the current cell as the violated cell, and outputs a signal indicating that the current cell violates the previous negotiated bandwidth to the bandwidth assignment unit 122. At this time, the bandwidth assignment unit 122 extracts the number of cells using the virtual path contained in the current window from the current counter value counting cells having identical virtual path identifier received within the current window time, by calculating the cell counter value on the receipt of the passed cell of the offset number 3 with equation 2 as mentioned above.

The bandwidth assignment unit 122 divides the current window time into the number of cells within the window in order to obtain the reciprocal result of the divided window time, and extracts the cell rate during the current window time of the virtual path containing the current cell, which cell rate becomes the usage bandwidth of the corresponding virtual path.

If the usage bandwidth calculated by equation 3 does not exceed the sum of the assignment bandwidth assigned to the channels, which admit all connections, contained in the corresponding virtual path, the bandwidth management section 122 does not discard a violated current cell to transmit the violated current cell. As a result, it is possible to obtain real time bandwidth assignment efficiency and improve the cell transmission efficiency due to decreasing cell loss ratio. Since, the limit within such a violated current cell does not exceed the total assignment bandwidth assigned to the virtual path containing the cell, the violated current cell is discarded, it has no effect on the congestion occurring in the network.

As may be apparent from the aforementioned description, a traffic control apparatus and method of the present invention is capable of easily executing and simplifying traffic control at a high speed by dividing a traffic control into a B-NT2 and local exchange, when a virtual path is fixedly assigned by separate classes.

What is claimed:

1. A network termination device for an integrated service digital network in an asynchronous transfer mode, comprising:

connection control means for receiving a call upon occurrence of a call request from a first subscriber to be connected with a second subscriber terminal, for identifying a traffic class from a plurality of traffic classes of an incoming stream of cells representative of said call upon reception of traffic parameters described by said first subscriber terminal and, for controlling call admission in dependence upon said traffic parameters;

generic flow control means operatively connected to said connection control means, for analyzing a generic flow control field assigned in a cell header upon reception of said call and for adjusting a traffic flow of the incoming stream of cells and minimizing cell transmission delay;

traffic control means operatively connected to said connection control means, for making a determination of whether the incoming stream of cells violates said traffic parameters described by said first subscriber terminal and for enabling execution of cell transmission, cell shaping, and cell discard in dependence upon said determination;

switch means operatively connected to said traffic control block means, for enabling transmission of the incoming stream of cells; and statistical multiplexer means having a routing information, operatively connected to said switch means and said connection control means for multiplexing the incoming stream of cells and outputting the stream of cells to one of a plurality of output routes upon designation of virtual path identifiers and virtual channel identifiers on the cells on a basis of said routing information.

2. The network termination device as claimed in claim 1, wherein said connection control means comprises:

signalling processor means for analyzing the traffic parameters described by said first subscriber terminal and identifying the traffic class of the incoming stream of cells each containing data of a fixed length;

call admission control means for generating a resource assignment request signal for enabling management of resources to an extent that quality of service is based upon the traffic parameters, and for assigning unused virtual channel identifiers contained in a virtual path of a corresponding identified traffic class of the incoming stream of cells; and resource management means operatively connected to said call admission control means, for responding to said resource assignment request signal for managing resources including assignment of bandwidth of the corresponding identified traffic class of the incoming stream of cells in dependence upon detection of congestion of said statistical multiplexer means.

3. The network termination device as claimed in claim 2, wherein said traffic control means comprises:

monitor management means for making a determination of whether the incoming stream of cells violates said traffic parameters described by said first subscriber terminal and for generating a bandwidth control signal in dependence upon said determination; and bandwidth management means logically connected to said monitor management means, for determining whether to assign additional bandwidth to perform, traffic shaping, and to discard cells upon reception of said bandwidth control signal in dependence upon said congestion of said statistical multiplexer means.

4. The network termination device as claimed in claim 2, wherein said traffic control means comprises:

a monitor unit for receiving and monitoring the incoming stream of cells and determining a minimum cell interval time allowed for each virtual path;

a timer for measuring a cell arrival time of the incoming stream of cells;

a memory for storing a current cell arrival time and a previous cell arrival time;

a subtractor for subtracting the previous cell arrival time from the current cell arrival time to produce a window time;

a comparator for comparing the window time with the minimum cell interval time and determining whether the incoming stream of cells violates said traffic parameters when the window time is smaller than the minimum cell interval time;

a counter for counting the number of cells received from said monitor unit;

said memory further storing a current cell counter value of the number of cells currently counted by said counter and a previous cell counter value of the number of cells previously counted by said counter as a representation of a total bandwidth value assigned to each virtual path;

said subtractor further subtracting the previous cell counter value from the current cell counter value to produce a number of cells having identical virtual path identifier within the window time;

a divider for providing a result by dividing the number of cells having identical virtual path identifier within the window time from the window time; and a bandwidth management section for determining a current usage bandwidth value currently being used for transmission of cells during a current window time from a reciprocal of said result of said divider and for generating a bandwidth control signal by comparing the current usage bandwidth value during the current window time and the total bandwidth value, said bandwidth control signal enabling cell discard when the current usage bandwidth value during the current window time is greater than the total bandwidth value, and enabling cell transmission when the current usage bandwidth value during the current window time is not greater than the total bandwidth value.

5. The network termination device as claimed in claim 2, wherein said traffic control means comprises:

monitor management means for receiving and monitoring the incoming stream of cells and determining a minimum cell interval time allowed for each virtual path, for measuring a cell arrival time of the incoming stream of cells, for storing a current cell arrival time and a previous cell arrival time, for subtracting the current cell arrival time and the previous cell arrival time to produce a window time, for determining that the incoming stream of cells violates said traffic parameters when the window time is smaller than the minimum cell interval time; and bandwidth management means for counting the number of cells received, storing a current cell counter value and a previous cell counter value representative of a total bandwidth value assigned to each virtual path, determining the number of cells having identical virtual path identifier within the time window by subtracting the previous cell counter value from the current cell counter value, for determining a current usage bandwidth of a current time window time based upon a reciprocal of a result of dividing the number of cells having identical virtual path identifiers within the window time from the window time, and for enabling a cell discard when the current usage bandwidth during the current window time is greater than the total bandwidth value, and enabling cell transmission when the current usage bandwidth during the current window time is not greater than the total bandwidth value.

6. The network termination device as claimed in claim 2, wherein said plurality of classes of the incoming stream of cells respectively represent class "A" indicative of voice data, class "B" indicative of real time image data, and class "C" indicative of general data.

7. The network termination device as claimed in claim 6, wherein said traffic control means comprises:

a data base for storing said traffic parameters for the incoming stream of cells of different traffic classes, traffic control routines for corresponding traffic classes according to the traffic parameters, and operation and maintenance function parameters for conducting operation and maintenance functions of a corresponding traffic class;

a cell header register for storing a cell header of each received cell;

a cell pool for storing the incoming stream of cells received in response to the call from the first subscriber terminal upon the occurrence of said call request;

a cell stream controller for providing cell control information in correspondence with input of window traffic control information;

a window traffic controller for controlling said cell header register in response to an input primitive transmitted from a physical layer to store the cell header and simultaneously controlling said data base to control traffic of the incoming stream of cells of different traffic classes by using the traffic control routines and operation and maintenance functions, and thereby outputting the window traffic control information to said cell stream controller; and a file register for storing selected ones of the traffic parameters and the operation and maintenance function parameters under the control of said window traffic controller.

8. The network termination device as claimed in claim 7, further comprised of said traffic parameters respectively representing service state information, a traffic control routine pointer for conducting one of the traffic control routines in correspondence with the identified traffic class of the cells, a previous cell arrival time, a previous cell counter value of a corresponding virtual path for performing operation anti maintenance functions, a cell tag counter for indicating a status of a cell loss priority bit included in the cell header for performing one of a cell discard and a cell transmission function, a cell discard counter for storing the number of cells discarded by the network, a minimum cell interval time, and residual offset information for assisting the operation and maintenance functions, and said operation and maintenance function parameters respectively representing a virtual path cell counter of a corresponding class, a virtual path maximum bandwidth and a virtual path total assignment bandwidth assignable to the virtual path of the cells.

9. The network termination device as claimed in claim 8, wherein said window traffic controller performs the traffic control routine of class "A" indicative of voice data to minimize cell loss and transmission delay by:

increasing a value of the virtual path cell counter by a first constant and storing a current cell arrival time;

determining a window time by subtracting the current cell arrival time and the previous cell arrival time;

making a determination whether the incoming stream of
cells violates said traffic parameters in dependence
upon a comparison between the window time and the
minimum cell interval time;

resetting the cell tag counter, enabling cell transmission
and terminating the traffic control routine when the
window time is not greater than the minimum cell
interval time;

increasing the cell tag counter by a second constant and
setting a tag bit of the service state information parameter and the cell loss priority bit included in the cell
header by a third constant when the window time is
greater than the minimum cell interval time;

comparing a current value of the cell tag counter with a
threshold value;

enabling cell transmission and terminating the traffic
control routine when the current value of the cell tag
counter is lower than said threshold value; and releasing a call connection and terminating the traffic
control routine when the current value of the cell tag
counter exceeds said threshold value.

10. The network termination device as claimed in claim 8, wherein said window traffic controller performs the traffic control routine of class "B" indicative of real time image data to minimize cell transmission delay by:

increasing a value of the virtual path cell counter by a first
constant and storing a current cell arrival time;

determining a window time by subtracting the current cell
arrival time and the previous cell arrival time;

making a determination whether the incoming stream of
cells violates said traffic parameters in dependence
upon a comparison between the window time and the
minimum cell interval time;

enabling cell transmission and terminating the traffic
control routine when the window time is not greater
than the minimum cell interval time;

determining the number of cells having identical virtual
path identifier within the window time by subtracting
the previous cell counter value from the current cell
counter value, and determining a current usage bandwidth based upon a reciprocal of a value resulted by
dividing the number of cells within the window time
from the window time;

comparing the current usage bandwidth with the total
assignment bandwidth value;

determining whether the network is in a congestion state
based upon the number of cells stored in said statistical
multiplexer means;

increasing the cell discard counter by a second constant to
thereby discard the current cell and terminate the traffic
control routine in dependence upon any one occurrences of when either the current usage bandwidth is
not less than the total assignment bandwidth, and when
the network is not in said congestion state;

increasing the cell tag counter by a third constant and
setting a tag bit of the service state information parameter and the cell loss priority bit included in the cell
header by a fourth constant when the network is in said
congestion state; and enabling cell transmission and terminating the traffic
control routine.

11. The network termination device as claimed in claim 8, wherein said window traffic controller performs the traffic control routine of class "C" indicative of general data to minimize cell loss by the steps of:

increasing a value of the virtual path cell counter by a first
constant and storing a current cell arrival time;

determining a window time by subtracting the current cell
arrival time and the previous cell arrival time;

making a determination of whether the incoming stream
of cells violates said traffic parameters in dependence
upon a comparison between the window time and the
minimum cell interval time;

making a determination of whether a storage buffer of said
cell pool is empty when the window time is not greater
than the minimum cell interval time;

enabling cell transmission and terminating the traffic
control routine when the storage buffer of said cell pool
is empty;

determining the number of cells having identical virtual
path identifier within the window time by subtracting
the previous cell counter value from the current cell
counter value, and determining a current usage bandwidth based upon a reciprocal of a value resulted by
dividing the number of cells within the window time
from the window time when the window time is not
greater than the minimum cell interval time;

comparing the current usage bandwidth with the total
assignment bandwidth;

increasing the cell tag counter by a second constant,
setting a buffering bit, a tag bit of the service state
information parameter and the cell loss priority bit
included in the cell header by a third constant and
buffering the current cell prior to termination of said
traffic control routine upon any one occurrences of
when the storage buffer of said cell pool is not empty,
and when the current usage bandwidth is greater than
the total assignment bandwidth;

determining whether the network is in a state of congestion during transmission of cells, based upon the number of cells stored in said statistical multiplexer means
when the current usage bandwidth is not greater than
the total assignment bandwidth;

increasing the cell tag counter by a fourth constant and
setting the tag bit and the cell loss priority bit by a fifth
constant for enabling cell transmission and subsequent
terminating the traffic control routine when the network
is not in said congestion state; and increasing the cell discard counter by a sixth constant to
thereby discard the current cell and terminating the
traffic control routine.

12. The network termination device as claimed in claim 8, further comprised of said virtual path identifiers of corresponding class "A" representing voice data, class "B" representing real time image data, and class "C" representing general data and signalling information assigned to the cells according to the traffic parameters as in the following Table <1>:

| Division Virtual Path | Division Reference | An Example of Traffic |
|---|---|---|
| VPIA | Delay Sensitivity Loss Sensitivity | Voice |
| VPIB | Delay Sensitivity | Real Time Image Service |
| VPIC | Loss Sensitivity | General Data |
| VPIS | Signalling | Signalling |

13. A local exchange for an integrated service digital network in an asynchronous transfer mode, comprising:

connection control means responsive to a call upon occurrence of a call establishment request from a first subscriber to be connected with a second subscriber terminal, for identifying a traffic class of a traffic flow of cells representative of said call upon reception of traffic parameters described by said first subscriber terminal, for routing a communication path to a destination intended by said call in dependence upon said traffic parameters;

first multiplexer means operatively connected to said connection control means, for multiplexing the traffic flow of cells into a single cell stream;

traffic control means operatively connected to said connection control means, for making a determination of whether the single cell stream violates said traffic parameters described by said first subscriber terminal and for enabling execution of cell transmission, cell shaping, and cell discard in dependence upon said determination;

switch means operatively connected to said traffic control means, for enabling transmission of the single cell stream; and second multiplexer means operatively connected between said switch means and said traffic control means, for transmitting the single cell stream having virtual path identifiers and virtual channel identifiers modified on a basis of a routing look-up table to another network.

14. The local exchange as claimed in claim 13, wherein said traffic control means comprises:

monitor management means for making a determination of whether the single cell stream violates said traffic parameters described by said first subscriber terminal and for generating a bandwidth control signal in dependence upon said determination; and bandwidth management means logically connected to said monitor management means, for determining whether to assign additional bandwidth, traffic shaping, and discarding of cells upon reception of said bandwidth control signal in dependence upon a congestion state of the network.

15. A traffic control method for an integrated service digital network in an asynchronous transfer mode comprising traffic control routines for controlling a traffic flow of cells of different traffic classes, each class having data of fixed length indicative of one of voice data, real time image data, and general data, said traffic control method comprising:

a connection control step for receiving and identifying a traffic class of traffic flow of cells representative of a call upon occurrence of a call establishment request from a first subscriber terminal to be connected with a second subscriber terminal for controlling admission of said call in dependence upon reception of traffic parameters described by said first subscriber terminal;

a traffic control step for making a determination of whether the traffic flow of cells violates said traffic parameters described by said first subscriber terminal and for enabling execution of cell transmission, traffic shaping, and discard of cells in dependence upon said determination, said traffic control step comprising:

monitoring the traffic flow of cells and determining a minimum cell interval time allowed for each virtual path;

measuring a cell arrival time of the traffic flow of cells;

storing a current cell arrival time and a previous cell arrival time;

subtracting the current cell arrival time and the previous cell arrival time to produce a window time;

determining that the traffic flow of cells violates said traffic parameters when the window time is smaller than the minimum cell interval time;

counting the number of cells received;

storing a current cell counter value and a previous cell counter value representative of a total bandwidth value assigned to each virtual path;

determining the number of cells having identical virtual path identifier within the time window by subtracting the previous cell counter value from the current cell counter value;

determining a current usage bandwidth of a current time window time based upon a reciprocal of a result of dividing the number of cells having identical virtual path identifier within the window time from the window time;

enabling cell discard when the current usage bandwidth during the current window time is greater than the total bandwidth value; and enabling cell transmission when the current usage bandwidth during the current window time is not greater than the total bandwidth value; and a call transmission step for enabling transmission of the cells by statistically multiplexing said cells for outputting to an output route.

16. The traffic control method as claimed in claim 15, wherein said plurality of classes of the traffic flow of cells respectively represent class "A" indicative of the voice data, class "B" indicative of the real time image data, and class "C" indicative of the general data.

17. The traffic control method as claimed in claim 16, further comprised of said traffic parameters respectively representing service state information, a traffic control routine pointer for conducting one of the traffic control routines in correspondence with the identified traffic class of the cells, a previous cell arrival time, a previous cell counter value of a corresponding virtual path for performing operation and maintenance functions, a cell tag counter for indicating a status of a cell loss priority bit included in the cell header for performing one of a cell discard and a cell transmission function, a cell discard counter for storing the number of cells discarded by the network, a minimum cell interval time, and residual offset information for assisting the operation and maintenance functions, and said operation and maintenance function parameters respectively representing a virtual path cell counter of a corresponding class, a virtual path maximum bandwidth and a virtual path total assignment bandwidth assignable to the virtual path of the cells.

18. The traffic control as claimed in claim 17, wherein said traffic control step further performs the traffic control routine of class "A" indicative of voice data to minimize cell loss and transmission delay by:

increasing a value of the virtual path cell counter by a first constant and storing a current cell arrival time;

determining a window time by subtracting the current cell arrival time and a previous cell arrival time;

making a determination whether the traffic flow of cells violates said traffic parameters in dependence upon a comparison between the window time and the minimum cell interval time;

resetting the cell tag counter, enabling cell transmission and terminating the traffic control routine when the window time is not greater than the minimum cell interval time;

increasing the cell tag counter by a second constant and setting a tag bit of the service state information parameter and the cell loss priority bit included in the cell header by a third constant when the window time is greater than the minimum cell interval time;

comparing a current value of the cell tag counter with a threshold value;

enabling cell transmission and terminating the traffic control routine when the current value of the cell tag counter is lower than said threshold value; and releasing the call connection and terminating the traffic control routine when the current value of the cell tag counter exceeds said threshold value.

19. The traffic control method as claimed in claim 17, wherein said traffic control step further performs the traffic control routine of class "B" indicative of real time image data to minimize cell transmission delay by:

increasing a value of the virtual path cell counter by a first constant and storing a current cell arrival time;

determining a window time by subtracting the current cell arrival time and a previous cell arrival time;

making a determination whether the traffic flow of cells violates said traffic parameters in dependence upon a comparison between the window time and the minimum cell interval time;

enabling cell transmission and terminating the traffic control routine when the window time is not greater than the minimum cell interval time;

determining the number of cells having identical virtual path identifiers within the window time by subtracting the previous cell counter value from the current cell counter value, and determining a current usage bandwidth based upon a reciprocal of a value obtained by dividing the number of cells within the window time from the window time;

comparing the current usage bandwidth with the total assignment bandwidth value;

determining whether the network is in a state of congestion during transmission of cells via the network, based upon the number of cells stored in an internal buffer of said network;

increasing the cell discard counter by a second constant to thereby discard a current cell and terminate the traffic control routine in dependence upon any one occurrences of when either the current usage bandwidth is not less than the total assignment bandwidth, and when the network is not in said state of congestion;

increasing the cell tag counter by a third constant and setting a tag bit of the service state information parameter and the cell loss priority bit included in the cell header by a fourth constant when the network is in said congestion state; and enabling cell transmission via the network and terminating the traffic control routine.

20. The traffic control method as claimed in claim 17, wherein said traffic control step further performs the traffic control routine of class "C" indicative of general data to minimize cell loss by:

increasing a value of the virtual path cell counter by a first constant and storing a current cell arrival time;

determining a window time by subtracting the current cell arrival time and a previous cell arrival time;

making a determination whether the traffic flow of cells violates said traffic parameters in dependence upon a comparison between the window time and the minimum cell interval time;

making a determination whether a storage buffer of the network is empty when the window time is not greater than the minimum cell interval time;

enabling cell transmission and terminating the traffic control routine when the storage buffer is empty;

determining the number of cells having identical virtual path identifiers within the window time by subtracting the previous cell counter value from the current cell counter value, and determining a current usage bandwidth based upon a reciprocal of a value obtained by dividing the number of cells within the window time from the window time when the window time is not greater than the minimum cell interval time;

comparing the current usage bandwidth with the total assignment bandwidth;

increasing the cell tag counter by a second constant, setting a buffering bit, a tag bit of the service state information parameter and the cell loss priority bit included in the cell header by a third constant and buffering the current cell prior to termination of said traffic control routine upon any one occurrence of when the storage buffer of the network is not empty, and when the current usage bandwidth is greater than the total assignment bandwidth;

determining whether the network is in a state of congestion during transmission of calls via the network, based upon the number of cells stored in an internal buffer of the network when the current usage bandwidth is not greater than the total assignment bandwidth;

increasing the cell tag counter by a fourth constant and setting the tag bit and the cell loss priority bit by a fifth constant for enabling cell transmission and subsequent terminating the traffic control routine when the network is not in said state of congestion; and increasing the cell discard counter by a sixth constant to thereby discard the current cell and terminating the traffic control routine.

21. A traffic control method for a user-network interface of an asynchronous transfer mode comprising a broadband-terminal device, a broadband-network termination device having storage means for storing traffic control routines for traffic controlling different traffic classes of an inflow of cells with data of a fixed length representing a call, and traffic parameters described by a calling subscriber terminal for assisting the traffic control, said broadband-network termination device analyzing virtual path identifier and virtual channel identifier in a cell header of a cell output from said broadband-terminal device and controlling the inflow of cells, and a local exchange for fixedly assigning the virtual path identifier to said broadband-network termination device in accordance with the traffic parameters and controlling the traffic of the inflow of cells through the assigned virtual path identifier and virtual channel identifier, said traffic control method comprising:

determining whether each cell from the inflow of cells violates the traffic parameters;

a traffic parameter loading step for storing a cell header of a currently received cell in response to an input primitive, and combining virtual path identifier, virtual channel identifier and offset bits from the cell header to be loaded into a parameter storage area when the currently received cell does not violate the traffic parameters; and a traffic control step for controlling the traffic of each cell from the inflow of cells in accordance with different traffic classes representing one of voice data, image data and general data determined by information loaded in said parameter storage area.

22. The traffic control method as claimed in claim 21, further comprised of said traffic parameter loading step further analyzing the virtual path identifier and the virtual channel identifier stored in the cell header, and identifying the traffic class by combining the virtual path identifier and the virtual channel identifier when the currently received cell observes said traffic parameters.

23. The traffic control method as claimed in claim 21, further comprised of determining the traffic class of the inflow of cells by combining control bits of the virtual path identifiers within the cell header.

24. A traffic control method for a user-network interface of an asynchronous transfer mode, said traffic control method comprising:

a monitoring step having a minimum cell interval time established by a connection admission control for receiving and monitoring whether an incoming stream of cells representing a call from a first subscriber terminal violates traffic parameters described by said first subscriber terminal, upon reception of said call from said first subscriber terminal requesting a connection through a transmission line to a second subscriber terminal by storing a current cell arrival time and a previous cell arrival time generated from said first subscriber terminal and calculating a window time and comparing the window time with the minimum cell interval time, said window time being calculated by the following equation:

$$window\ time\ W_i(t-1,t) = current\ cell\ arrival\ time\ T(t) - previous\ cell\ arrival\ time\ _iT(t-1),$$

where $T_i(t)$ represents a current cell arrival time of a channel i, and $T_i(t-I)$ represents a previous cell arrival time of the channel i; and a bandwidth management step for controlling bandwidth assignment of the cells by counting the number of cells received, storing a previous cell counter value and a current cell counter value indicative of a value of a total assignment bandwidth assigned to a virtual path containing a current cell, extracting the number of cells having identical virtual path identifier within the window time by subtracting the current cell counter value from the previous cell counter value, extracting a current usage bandwidth during a current window time and comparing the current usage bandwidth with the total assignment bandwidth so as to assign said current usage bandwidth for transmission of the current cell, said current usage bandwidth during the current window time being calculated by the following equation:

$$current\ usage\ bandwidth\ during\ current\ window\ time = 1 \div (window\ time \div the\ number\ of\ cells\ having\ identical\ virtual\ path\ identifier\ in\ the\ window\ time).$$

25. A traffic controller of a network termination device, comprising:

monitoring means having a minimum cell interval time allowed for each virtual path, for receiving an incoming stream of cells of different traffic classes representing a call from a first subscriber terminal requesting a connection through a transmission line to a second subscriber terminal, and for determining whether the incoming stream of cells violates said traffic parameters in dependence upon a comparison between an elapsed time from a current cell arrival time and a previous cell arrival time and the minimum cell interval time; and bandwidth assignment means for determining a current usage bandwidth for transmission of the incoming stream of cells during said elapsed time based upon a reciprocal of a result from dividing the number of cells having identical virtual path identifier within said elapsed time from said elapsed time, and for discarding each successive cell when the current usage bandwidth during said elapsed time is greater than a total bandwidth value assigned for each virtual path and for enabling cell transmission when the current usage bandwidth during said elapsed time is not greater than the total bandwidth value.

26. The traffic controller as claimed in claim 25, further comprised of said incoming stream of cells respectively represent traffic class "A" indicative of voice data, traffic class "B" indicative of real time image data, and traffic class "C" indicative of general data.

* * * * *